United States Patent
Sohma

(10) Patent No.: US 10,628,476 B2
(45) Date of Patent: Apr. 21, 2020

(54) INFORMATION PROCESSING APPARATUS, INFORMATION PROCESSING METHOD, INFORMATION PROCESSING SYSTEM, AND STORAGE MEDIUM

(71) Applicant: CANON KABUSHIKI KAISHA, Tokyo (JP)

(72) Inventor: Hidetomo Sohma, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 310 days.

(21) Appl. No.: 15/040,289

(22) Filed: Feb. 10, 2016

(65) Prior Publication Data

US 2016/0239564 A1    Aug. 18, 2016

(30) Foreign Application Priority Data

Feb. 16, 2015 (JP) ................. 2015-027942

(51) Int. Cl.
G06F 17/30 (2006.01)
G06F 16/35 (2019.01)

(52) U.S. Cl.
CPC ............ G06F 16/358 (2019.01); G06F 16/35 (2019.01)

(58) Field of Classification Search
USPC .................... 707/600, 739; 704/2
See application file for complete search history.

(56) References Cited

U.S. PATENT DOCUMENTS

| | | | |
|---|---|---|---|
| 4,706,212 A * | 11/1987 | Toma | G06F 17/271 704/2 |
| 7,463,290 B2 | 12/2008 | Tojo et al. | |
| 7,741,079 B2 * | 6/2010 | Frazer | C07K 14/005 435/354 |
| 9,063,930 B2 * | 6/2015 | Zadeh | G06N 7/02 |
| 2004/0142325 A1 * | 7/2004 | Mintz | G16B 40/00 435/6.12 |
| 2006/0004706 A1 * | 1/2006 | Tomioka | C07K 1/00 |
| 2012/0278102 A1 * | 11/2012 | Johnson | G06Q 10/10 705/3 |
| 2013/0246334 A1 * | 9/2013 | Ahuja | G06F 17/30713 707/600 |
| 2013/0324426 A1 * | 12/2013 | Brevnova | C40B 30/02 506/8 |
| 2015/0220774 A1 * | 8/2015 | Ebersman | G06K 9/00308 382/118 |

FOREIGN PATENT DOCUMENTS

WO    2005/122002 A2    12/2005

* cited by examiner

Primary Examiner — Hung T Vy
(74) Attorney, Agent, or Firm — Venable LLP

(57) ABSTRACT

An information processing apparatus includes: an analysis unit configured to analyze a text; an obtaining unit configured to obtain term expressions from the text based on a result of the analysis; a classifying structuring unit configured to classify the term expressions based on a usage type of the term expressions; and a presentation unit configured to present a result of the classification based on a unified presentation sequence.

16 Claims, 17 Drawing Sheets

F I G. 5A

ON THE UPPER LOBE OF LEFT LUNG, THERE IS A LOW DENSITY AREA ABOUT 25mm, WHICH IS CONSIDERED AS A NEOPLASTIC LESION. THE LESION IS LOBULATED AND HAS A SIGNIFICANT SIZE. THERE IS INFILTRATION OF THE LESION INTO THE BRONCHI. THERE IS THE LESION APPEARED A SOFT TISSUE DENSITY AND NO CALCIFICATION. LUNG CANCER IS SUSPECTED. PLEASE MAKE EVALUATION IN COMBINATION WITH ENDOSCOPIC EXAMINATION OR THE LIKE. THANK YOU FOR YOUR HELP.

FIG. 5B

| DESCRIPTION | PART OF SPEECH | SYNTAX STRUCTURE | TERM | SUPPLEMENTARY EXPRESSION | PERCEPTUAL EXPRESSION |
|---|---|---|---|---|---|
| ON | PREPOSITION | PREPOSITIONAL PHRASE | | | |
| THE | DETERMINER | NOUN PHRASE | | | |
| UPPER LOBE | NOUN | | REGION NAME | | |
| OF | NOUN | | | | |
| LEFT LUNG | DETERMINER | | | | |
| , | COMMA | | | | |
| THERE | ADVERB | VERB PHRASE | | | PERCEPTION |
| IS | VERB | | | | |
| A | DETERMINER | NOUN PHRASE | | | |
| LOW DENSITY AREA | NOUN | | IMAGE FEATURE NAME | | |
| ABOUT | DETERMINER | NOUN PHRASE | SIZE-CONCRETENESS | | |
| 25 | NUMBER-NOUN | PREPOSITIONAL PHRASE <ROLE: MODIFICATION, TARGET: "A LOW DENSITY AREA"> | | | |
| mm | UNIT-NOUN | | | | |
| , | COMMA | | | | |
| WHICH | RELATIVE-PRONOUN | | | | |
| IS CONSIDERED | VERB | VERB PHRASE | | | RECOGNITION |
| AS | PREPOSITION | PREPOSITIONAL PHRASE | | | |
| A | DETERMINER | NOUN PHRASE | | | |
| NEOPLASTIC LESION | NOUN | | | LESION-ABNORMALITY NAME | |
| . | PERIOD | SENTENCE-END | | | |
| THE | DETERMINER | NOUN PHRASE | | LESION-ABNORMALITY NAME | |
| LESION | NOUN | | | | |
| IS | VERB | VERB PHRASE | | | VERB PERCEPTION |
| LABULATED | NOUN | | | SHAPE | |
| AND | CONJUNCTION | | | | |
| HAS | VERB | VERB PHRASE | | | VERB PERCEPTION |
| A | DETERMINER | NOUN PHRASE | | | |
| SIGNIFICANT | ADJECTIVE | | | SIZE | |
| SIZE | NOUN | | | | |
| . | PERIOD | SENTENCE-END | | | |
| ... | ... | ... | ... | ... | ... |

F I G. 6A

| TERM EXPRESSION | TERM ATTRIBUTE | SUPPLEMENTARY EXPRESSION ATTRIBUTE | SUPPLEMENTARY EXPRESSION VALUE:STATE | PERCEPTUAL EXPRESSION |
|---|---|---|---|---|
| UPPER LOBE OF LEFT LUNG | REGION NAME | - | - | |
| LOW DENSITY AREA | IMAGE FEATURE NAME | - | - | THERE IS (VISUAL PERCEPTION) |
| | | SIZE-CONCRETENESS | ABOUT 25mm | |
| NEOPLASTIC LESION | LESION-ABNORMALITY NAME | - | - | IS CONSIDERED (RECOGNITION) |
| - | - | SHAPE | LOBULATED | IS (VISUAL PERCEPTION) |
| - | - | SIZE | SIGNIFICANT SIZE | HAS (VISUAL PERCEPTION) |
| - | - | STATE | INFILTRATION INTO BRONCHI | THERE IS (VISUAL PERCEPTION) |
| - | - | DENSITY-CONCRETENESS | SOFT TISSUE DENSITY | IS APPEARED (VISUAL PERCEPTION) |
| - | - | STATE | CALCIFICATION | IS APPEARED, NO (VISUAL PERCEPTION, NEGATION) |
| LUNG CANCER | DISEASE NAME | - | - | SUSPECTED (POSSIBILITY) |
| ENDOSCOPIC EXAMINATION OR THE LIKE | EXAMINATION NAME | - | - | PLEASE MAKE EVALUATION (REQUEST) |
| - | - | - | - | THANK YOU FOR YOUR HELP (REQUEST) |

F I G. 6B

| INFORMATION CLASSIFICATION | | TERM | | SUPPLEMENTARY EXPRESSION | | PERCEPTUAL EXPRESSION |
|---|---|---|---|---|---|---|
| CLASSIFICATION | DETAILS | TERM | TERM ATTRIBUTE | SUPPLEMENTARY EXPRESSION ATTRIBUTE | SUPPLEMENTARY EXPRESSION VALUE·STATE | |
| OBSERVATION | IMAGE OBSERVATION | LOW DENSITY AREA | IMAGE FEATURE NAME | - | - | THERE IS (VISUAL PERCEPTION) |
| | | | | REGION | UPPER LOBE OF LEFT LUNG | |
| | | | | SIZE-CONCRETENESS | ABOUT 25mm | |
| | | | | DENSITY-CONCRETENESS | SOFT TISSUE DENSITY | IS APPEARED (VISUAL PERCEPTION) |
| FINDING | IMAGE FINDING | NEOPLASTIC LESION | LESION·ABNORMALITY NAME | - | - | IS CONSIDERED (RECOGNITION) |
| | | | | REGION | UPPER LOBE OF LEFT LUNG | |
| | | | | SHAPE | LOBULATED | |
| | | | | SIZE | SIGNIFICANT SIZE | |
| | | | | STATE | INFILTRATION INTO BRONCHI | IS CONSIDERED (RECOGNITION) |
| | | | | STATE | CALCIFICATION | IS APPEARED,NO (VISUAL PERCEPTION, NEGATION) |
| DIAGNOSIS | - | LUNG CANCER | DISEASE NAME | - | - | SUSPECTED (POSSIBILITY) |
| PLAN·REQUEST | EXAMINATION REQUEST | ENDOSCOPIC EXAMINATION OR THE LIKE | EXAMINATION NAME | | | PLEASE MAKE EVALUATION (REQUEST) |
| OTHERS | GREETING | | | | | THANK YOU FOR YOUR HELP (REQUEST) |

F I G. 7

```
<? xml version = "1.0" encoding = "utf-8"?>
<document>
ON THE UPPER LOBE OF LEFT LUNG, THERE IS A LOW DENSITY AREA ABOUT 25mm,
WHICH IS CONSIDERED AS A NEOPLASTIC LESION. THE LESION IS LOBULATED AND
HAS A SIGNIFICANT SIZE. THERE IS INFILTRATION OF THE LESION INTO THE BRONCHI.
THERE IS THE LESION APPEARED A SOFT TISSUE DENSITY AND NO CALCIFICATION.
LUNG CANCER IS SUSPECTED. PLEASE MAKE EVALUATION IN COMBINATION WITH
ENDOSCOPIC EXAMINATION OR THE LIKE. THANK YOU FOR YOUR HELP.
</document>
<structuredDocument>
<process type = "OBSERVATION" subType = "IMAGE OBSERVATION">
 <target name = "LOW DENSITY AREA" type = "IMAGE FEATURE NAME" position = "12" length = "4" ... >
  <perception name = "THERE IS" nameRaw = "THERE IS" type = "VISUAL PERCEPTION" position = "17" ... />
  <property name = "UPPER LOBE OF LEFT LUNG" type = "REGION" position = "0" length = "4" ... />
  <property name = "ABOUT 25mm" type = "SIZE" subType = "CONCRETENESS" position = ... />
  <property name = "SOFT TISSUE DENSITY" type = "DENSITY" position = ...>
   <perception name = "IS APPEARED" nameRaw = "IS APPEARED" type = "PERCEPTION" position = ... />
  </property>
 </target>
</process type = "FINDING" subtype = "IMAGE FINDING" position = ... >
 <target name = "NEOPLASTIC LESION" type "LESION-ABNORMALITY NAME" position = "19" length "5" ... >
  <perception name = "IS CONSIDERED" nameRaw = "IS CONSIDERED" type = "RECOGNITION" position = ... />
  <property name = "UPPER LOBE OF LEFT LUNG" type = "REGION" position = "0" length = "4" ... />
  <property name = "LOBULATED" type = "SHAPE" position = ... />
  <property name = "SIGNIFICANT SIZE TYPE" type = "SIZE" position = ... />
  <property name = "INFILTRATION INTO BRONCHI" type = "STATE" subType "INFILTRATION" with "BRONCHI" ... >
   <perception name = "IS CONSIDERED" nameRaw = "IS CONSIDERED" type = "RECOGNITION" position = ... >
  </property>
  <property name = "CALCIFICATION" type = "STATE" subType = "CALCIFICATION" position = ... >
   <perception name = "IS APPEARED_NO" nameRaw = "IS APPEARED_NO" type = "RECOGNITION" position = ... />
   <perception name = "NOT" nameRaw = "NOT" type "NEGATION" position = ... />
  </property>
 </target>
</process>
...
</structuredDocument>
```

FIG. 8

| STRUCTURED DISPLA | | | | | |
|---|---|---|---|---|---|
| REGION | UPPER LOBE OF LEFT LUNG | | | | |
| ...... | OBSERVATION | FINDING | DIAGNOSIS | PLAN:REQUEST | |
| TARGET | LOW DENSITY AREA <THERE IS> | NEOPLASTIC LESION <IS CONSIDERED> | LUNG CANCER <SUSPECTED> | ENDOSCOPIC EXAMINATION OR THE LIKE <PLEASE MAKE EVALUATION> | |
| SIZE | ABOUT 25mm | SIGNIFICANT SIZE | | | |
| DENSITY | SOFT TISSUE DENSITY <IS APPEARED> | | | | |
| SHAPE | | LOBULATED <SEEN> | | | |
| STATE | | INFILTRATION INTO BRONCHI <IS CONSIDERED> | | | |
| | | CALCIFICATION <<IS APPEARED, NO>> | | | |

COMPARISON WITH PREVIOUS EXAMINATIONS (XX (MONTH) YY (DAY)).
ON THE UPPER LOBE OF LEFT LUNG, THERE IS A NEOPLASTIC LESION ABOUT 27mm.
THERE IS NOT CALCIFICATION. THE LESION IS LOBULATED OR IRREGULAR SHAPE.
THERE IS FILTRATION OF THE LESION INTO THE BRONCHI. THERE IS NO SIGNIFICANT
CHANGE FROM PREVIOUS STATE. ON THE UPPER LOBE OF RIGHT LUNG,
THERE IS A NODULE.

FIG. 9B

| STRUCTURED DISPLAY-COMPARISON | | | | |
|---|---|---|---|---|
| REGION | UPPER LOBE OF LEFT LUNG [ENHANCEMENT OF ADDITION] | | | |
| | OBSERVATION | FINDING | DIAGNOSIS | PLAN·REQUEST |
| TARGET | LOW DENSITY AREA <THERE IS> →(NO EXPRESSION) | NEOPLASTIC LESION <IS CONSIDERED> | LUNG CANCER <SUSPECTED> →(NO EXPRESSION) | ENDOSCOPIC EXAMINATION OR THE LIKE <PLEASE MAKE EVALUATION> →(NO EXPRESSION) |
| SIZE | ABOUT 25mm → ABOUT 27mm | SIGNIFICANT SIZE →(NO EXPRESSION) | | |
| DENSITY | SOFT TISSUE DENSITY <IS APPEARED> | | | |
| SHAPE "SHAPE" | | LOBULATED OR IRREGULAR SHAPE <IS CONSIDERED> | | |
| STATE | | INFILTRATION INTO BRONCHI <IS CONSIDERED> | | |
| | | CALCIFICATION <<IS APPEARED,NO>> | | |
| REGION | UPPER LOBE OF RIGHT LUNG [NEW] | | | |
| | OBSERVATION | FINDING | DIAGNOSIS | PLAN·REQUEST |
| TARGET | | (NO EXPRESSION) →NODULE <IS CONSIDERED> | | |

FIG. 11A

ON THE UPPER LOBE OF LEFT LUNG, THERE IS NEOPLASTIC LESION, ABOUT 27mm.
THE LESION HAS LOBULATED SHAPE. THERE IS NOT CALCIFICATION.
LUNG CANCER IS SUSPECTED. THERE IS AN INFILTRATIVE SHADOW.

FIG. 11B

| STRUCTURE DISPLAY | | | | | END |
|---|---|---|---|---|---|
| REGION | UPPER LOBE OF LEFT LUNG | | | | |
| | OBSERVATION | FINDING | DIAGNOSIS | PLAN·REQUEST | |
| TARGET | | NEOPLASTIC LESION <IS CONSIDERED> | LUNG CANCER <SUSPECTED> | | |
| SIZE | ABOUT 27mm | | | | |
| SHAPE | | LOBULATED | | | |
| STATE | INFILTRATIVE SHADOW <IS CONSIDERED> | CALCIFICATION <<IS APPEARED,NO>> | | | |
| ADD | | | | | |
| PARTIALLY ADD | | | | | |

FIG. 12A

| STRUCTURED DISPLAY | | | | END |
|---|---|---|---|---|
| REGION | UPPER LOBE OF LEFT LUNG | | | |
| | OBSERVATION | FINDING | DIAGNOSIS | PLAN·REQUEST |
| TARGET | | NEOPLASTIC LESION <IS CONSIDERED> | LUNG CANCER <SUSPECTED> | |
| SIZE | ABOUT 27mm | | | |
| SHAPE | | LOBULATED | | |
| STATE | | CALCIFICATION <<IS APPEARED,NO>> | | |
| ADD | | | | |
| REGION | ENTIRE LUNGS | | | |
| | OBSERVATION | FINDING | DIAGNOSIS | PLAN·REQUEST |
| STATE | | INFILTRATIVE SHADOW <IS CONSIDERED> | | |
| ADD REGION | | | | |

1213    1216    1217

F I G. 12B

| EDITING TYPE | INFORMATION CLASSIFICATION | | TERM | | | SUPPLEMENTARY EXPRESSION | | | PERCEPTUAL EXPRESSION |
|---|---|---|---|---|---|---|---|---|---|
| | CLASSIFICATION | DETAILS | TERM EXPRESSION | TERM ATTRIBUTE | | SUPPLEMENTARY EXPRESSION ATTRIBUTE | SUPPLEMENTARY EXPRESSION VALUE:STATE | | |
| DELETION | OBSERVATION | IMAGE OBSERVATION | INFILTRATIVE SHADOW | LESION-ABNORMALITY NAME | | REGION | UPPER LOBE OF LEFT LUNG | | - |
| ADDITION | FINDING | IMAGE FINDING | INFILTRATIVE SHADOW | LESION-ABNORMALITY NAME | | REGION | ENTIRE LUNGS | | - |

F I G. 13A

| INFORMATION CLASSIFICATION | | TERM | | SUPPLEMENTARY EXPRESSION | | PERCEPTUAL EXPRESSION |
|---|---|---|---|---|---|---|
| CLASSIFICATION | DETAILS | TERM EXPRESSION | TERM ATTRIBUTE | SUPPLEMENTARY EXPRESSION ATTRIBUTE | SUPPLEMENTARY EXPRESSION VALUE·STATE | |
| OBSERVATION | LESION DETECTION-1 | | | - | - | IMAGE LESION DETECTION |
| | | | | REGION | UPPER LOBE OF RIGHT LING | |
| | | | | SIZE | 8mm | IMAGE LESION DETECTION· AUTOMATIC MEASUREMENT |
| FINDING | LESION DETECTION-1 | NODULE | LESION· ABNORMALITY NAME | - | - | IMAGE LESION DETECTION |
| | | | | REGION | UPPER LOBE OF RIGHT LUNG | |

FIG. 13B

| STRUCTURE DISPLAY | | | | END |
|---|---|---|---|---|
| REGION | UPPER LOBE OF LEFT LUNG | | | |
| | OBSERVATION | FINDING | DIAGNOSIS | PLAN·REQUEST |
| TARGET | | NEOPLASTIC LESION <IS CONSIDERED> | LUNG CANCER <SUSPECTED> | |
| SIZE | ABOUT 27mm | | | |
| SHAPE | | LOBULATED | | |
| STATE | | CALCIFICATION <<IS APPEARED,NO>> | | |
| ADD | | | | |
| REGION | ENTIRE LUNGS | | | |
| | OBSERVATION | FINDING | DIAGNOSIS | PLAN·REQUEST |
| STATE | | INFILTRATIVE SHADOW <IS CONSIDERED> | | |
| REGION | UPPER LOBE OF RIGHT LUNG ~1301 | | | |
| | OBSERVATION | FINDING | DIAGNOSIS | PLAN·REQUEST |
| TARGET | | NODULE <IMAGE LESION DETECTION> | | |
| SIZE | 8mm <AUTOMATIC MEASUREMENT> | | | |
| ADD REGION | 1302  1303 | | | |

INFORMATION PROCESSING APPARATUS, INFORMATION PROCESSING METHOD, INFORMATION PROCESSING SYSTEM, AND STORAGE MEDIUM

BACKGROUND OF THE INVENTION

Field of the Invention

The present invention relates to an information processing apparatus, an information processing method, an information processing system, and a storage medium.

Description of the Related Art

In medical sites, information systems for supporting medical work have been used, including electronic health record systems and order entry systems for various types of imaging using radiation imaging apparatuses.

In addition, in medical sites, it is being possible to perform image diagnosis using medical images. Image diagnosis using medical images is performed when a doctor as a medical image interpreter interprets medical images and a clinician (a requesting doctor who has made a request for interpretation) makes final consideration regarding diagnostic results concerning disease identification, treatment planning, and the like in addition to the interpretation result obtained by the medical image interpreter or the like and other types of medical information. The doctor then writes the image diagnosis result as text data managed by a medical information system. The description contents are called an interpretation report. An interpretation report is written and managed singly or managed upon being written in an electronic health record. This interpretation report is used when considering a diagnostic result.

As the functional specialization of interpretation activities by doctors dedicated to interpretation, mainly by radiologists, has led to a division of labor and the number of times of imaging has increased, the amount of work performed by each doctor has increased. In order to reduce the work load on each doctor, demands have arisen for functions such as a function of supporting work in interpretation activities and a function of supporting writing of interpretation reports.

International Publication No. 2005/122002 discloses a technique of filling in values on a template prepared for events to be written, concerning writing in an interpretation report input in a natural language, by classifying written events by using the template and extracting essential expressions from the events.

An interpretation report is a report in which a doctor who has performed interpretation writes, based on his knowledge about medicine and medical care, information about a patient and thoughts about what is happening based on obtained medical images. This report then describes information indicating what kind of abnormality is found on a medical image and information indicating a doctor's idea about what kind of disease the patient has.

Many interpretation reports differ in the manner of writing depending on target diseases and medical image interpreters who have written the reports. In addition, some interpretation reports are those in which, for example, medical image interpreters use technical terms or omit some expressions to be written based on the premise of knowledge about medicine and medical care, because of the assumption that medical image interpreters having knowledge about medicine and medical care are the readers of the interpretation reports.

When writing an interpretation report using a natural language, the sequence of a text differs from that based on the logical relationship between contents thought by the medical image interpreter depending on the manner of writing by the medical image interpreter, rules such as the grammar of the natural language used, the writing rules of texts, and the like. For this reason, the appearance order of expressions and the description orders of information and texts can differ from those in the contents thought by the doctor.

In consideration of the above problems, the present invention provides a processing technique of presenting the contents of a text in a unified form and facilitating grasping the contents of the text.

SUMMARY OF THE INVENTION

According to one aspect of the present invention, there is provided an information processing apparatus comprising: an analysis unit configured to analyze a text; an obtaining unit configured to obtain term expressions from the text based on a result of the analysis; a classifying structuring unit configured to classify the term expressions based on a usage type of the term expressions; and a presentation unit configured to present a result of the classification based on a unified presentation sequence, wherein the analysis unit, the obtaining unit, the classifying structuring unit, and the presentation unit are implemented using a processor and a program stored in a memory.

According to another aspect of the present invention, there is provided an information processing system comprising: an analysis unit configured to analyze a text; an obtaining unit configured to obtain term expressions from the text based on a result of the analysis; a classifying structuring unit configured to classify the term expressions based on a usage type of the term expressions; and a presentation unit configured to present a result of the classification based on a unified presentation sequence, wherein the analysis unit, the obtaining unit, the classifying structuring unit, and the presentation unit are implemented using a processor and a program stored in a memory.

According to still another aspect of the present invention, there is provided an information processing apparatus comprising: an analysis unit configured to analyze a text; an obtaining unit configured to obtain term expressions from the text based on a result of the analysis; a classifying structuring unit configured to classify the term expressions based on a usage type of the term expressions; and a presentation unit configured to present a result of the classification based on a unified presentation sequence.

According to yet another aspect of the present invention, there is provided an information processing system comprising: an analysis unit configured to analyze a text; an obtaining unit configured to obtain term expressions from the text based on a result of the analysis; a classifying structuring unit configured to classify the term expressions based on a usage type of the term expressions; and a presentation unit configured to present a result of the classification based on a unified presentation sequence.

Further features of the present invention will become apparent from the following description of exemplary embodiments (with reference to the attached drawings).

BRIEF DESCRIPTION OF THE DRAWINGS

FIGS. 5A and 5B are views exemplarily showing a state in which an example text is divided word by word by morphological analysis;

FIG. 6A is a view exemplarily showing the result of obtaining terms, supplementary expressions, and perceptual expressions;

FIG. 6B is a view exemplarily showing the result of classifying terms, supplementary expressions, and perceptual expressions;

FIG. 7 is a view exemplarily showing contents obtained by converting the classification result into a format;

FIG. 8 is a view exemplarily showing a display on a screen at the time of structured presentation;

FIGS. 9A and 9B are views exemplarily showing a display on the screen which indicates an interpretation report comparison result;

FIG. 11A is a view showing example of an interpretation report;

FIG. 11B is a view showing an example of a screen for editing the contents of a presented interpretation report;

FIG. 12A is a view exemplarily showing the contents of an edited interpretation report;

FIG. 12B is a view showing an example of learning data;

FIG. 13A is a view showing an example of input data from an image lesion detection unit; and FIG. 13B is a view exemplarily showing an updated display on a screen.

DESCRIPTION OF THE EMBODIMENTS

Embodiments of the present invention will be exemplarily described in detail below with reference to the accompanying drawings. Note that the constituent elements described in the embodiments are merely examples. The technical scope of the present invention is determined by the scope of claims and is not limited by the following individual embodiments.

Figure 1:
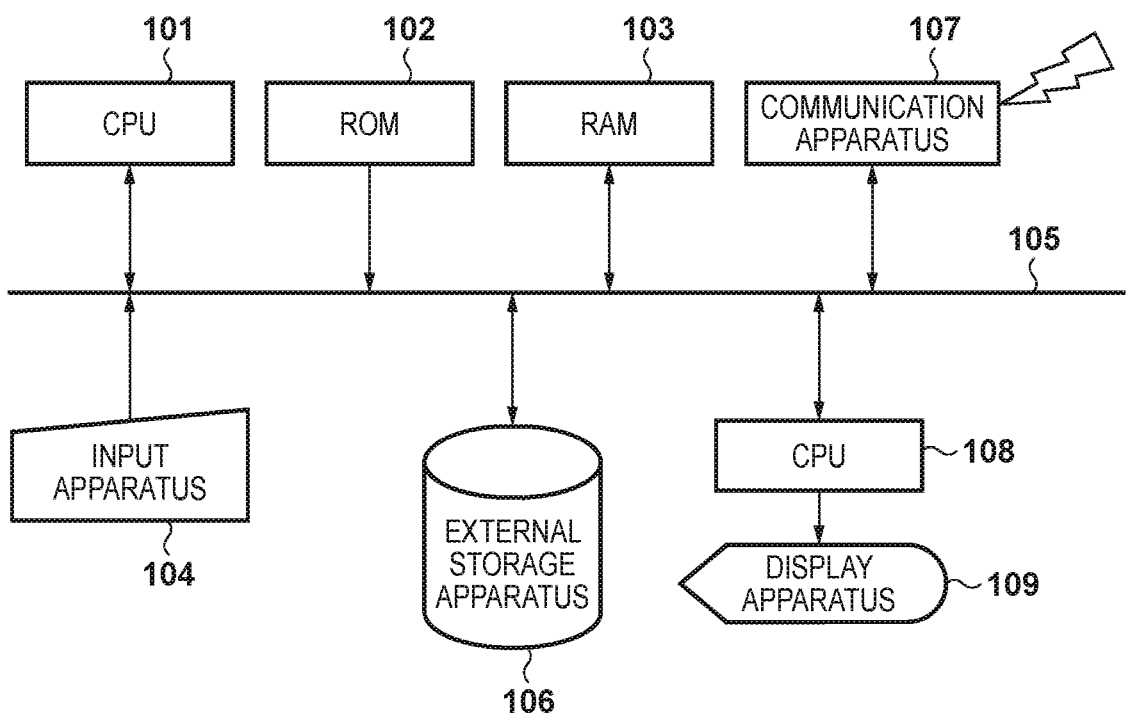
FIG. 1 is a block diagram showing the arrangement of an information processing apparatus according to an embodiment.

FIG. 1 is a block diagram showing the arrangement of an information processing apparatus according to an embodiment. A CPU 101 executes various types of control on various types of systems according to this embodiment. Work contents are instructed by programs in a ROM 102 and RAM 103 (which are to be described later). In addition, a plurality of computer programs can also be concurrently operated depending on the function of the CPU 101 itself and the mechanisms of the computer programs.

The ROM 102 stores computer programs in which control procedures by the CPU 101 are stored and data.

The RAM 103 stores control programs for processing by the CPU 101 and provides a work area for various types of data when the CPU 101 executes various types of control.

An input apparatus 104 is constituted by a keyboard and a mouse which provide various types of input operation environments for the user. The input apparatus 104 can be constituted by a touch panel, a stylus pen, and the like as long as they provide various types of input operation environments for the user. In addition, the input apparatus 104 can be formed from an input unit which accepts inputs by speech recognition and gesture operations.

A bus 105 includes an address bus and a data bus which are connected to each unit of the internal arrangement. The bus 105 provides an information exchange/communication function between the respective units. This allows the respective units to cooperatively operate.

An external storage apparatus 106 is a storage unit which stores various computer programs, data, and the like. The external storage apparatus 106 is constituted by a recording medium such as a hard disk, flexible disk, optical disk, magnetic disk, magnetic tape, or nonvolatile memory card, a drive which records information by driving a storage medium, and the like. Computer programs and data stored in the external storage apparatus 106 are loaded onto the RAM 103 as needed by instructions from the keyboard and the like or instructions from various types of computer programs.

A communication apparatus 107 (NCU) is a communication unit for communicating with other computer apparatuses and the like. The communication apparatus 107 (NCU) can communicate with an apparatus (not shown) existing in a remote place and share computer programs and data according to this embodiment via a network (LAN) or the like. The communication apparatus 107 (NCU) can communicate with other computer apparatuses and the like by wired communication such as RS232C, USB, IEEE1394, P1284, SCSI, modem, or Ethernet□ or by wireless communication such as Bluetooth□, infrared communication, or IEEE802.11a/b/n.

A GPU 108 can transmit and receive data to and from the CPU 101 and the like via the bus 105. The GPU 108 performs calculations for the creation of an image of display contents, a display position, and the like, sends the calculation results to a display apparatus 109, and causes it to draw the image in accordance with supplied display and calculation instructions. The GPU 108 can also return the calculation results to the CPU 101 via the bus 105 and perform calculation processing in cooperation with the CPU 101.

The display apparatus 109 is constituted by a display and the like, and displays the state of each type of input operation and corresponding calculation results to the user.

Computer programs, data, and the like which implement information processing (text processing) according to this embodiment are stored in storage media such as the ROM 102, the RAM 103, and the external storage apparatus 106. The CPU 101 reads out and executes programs stored in these recording media to implement a predetermined functional configuration. For example, the information processing apparatus (information processing system) according to this embodiment includes a functional configuration including an analysis unit which analyzes a text, an obtaining unit which obtains expressions with different attributes in a text based on the analysis result, a classifying structuring unit which classifies the expressions with the different attributes into predetermined items, and a presentation unit which presents the classification result based on a predetermined form. The CPU 101 reads out and executes programs to implement this functional configuration.

The information processing apparatus according to this embodiment may obtain computer programs and data to be used from another device via the communication apparatus 107 as well as from the external storage apparatus 106. Likewise, the information processing apparatus can store generated data in not only the ROM 102, the RAM 103, and the external storage apparatus 106 but also in another device via the communication apparatus 107.

The internal arrangement described above is merely an example and is not exhaustive. This internal arrangement is not limited to so-called hardware and may be virtually implemented by software. In addition, the above internal arrangement can be used as an apparatus alone. In addition, the internal arrangement in FIG. 1 can be used in cooperation with a plurality of apparatuses by exchanging and sharing information using the communication apparatus 107. In this case, the respective apparatuses may be located in different places and operate in cooperation with each other via a LAN, the Internet, or the like, and may include functional configurations virtually implemented by software.

Figure 2:
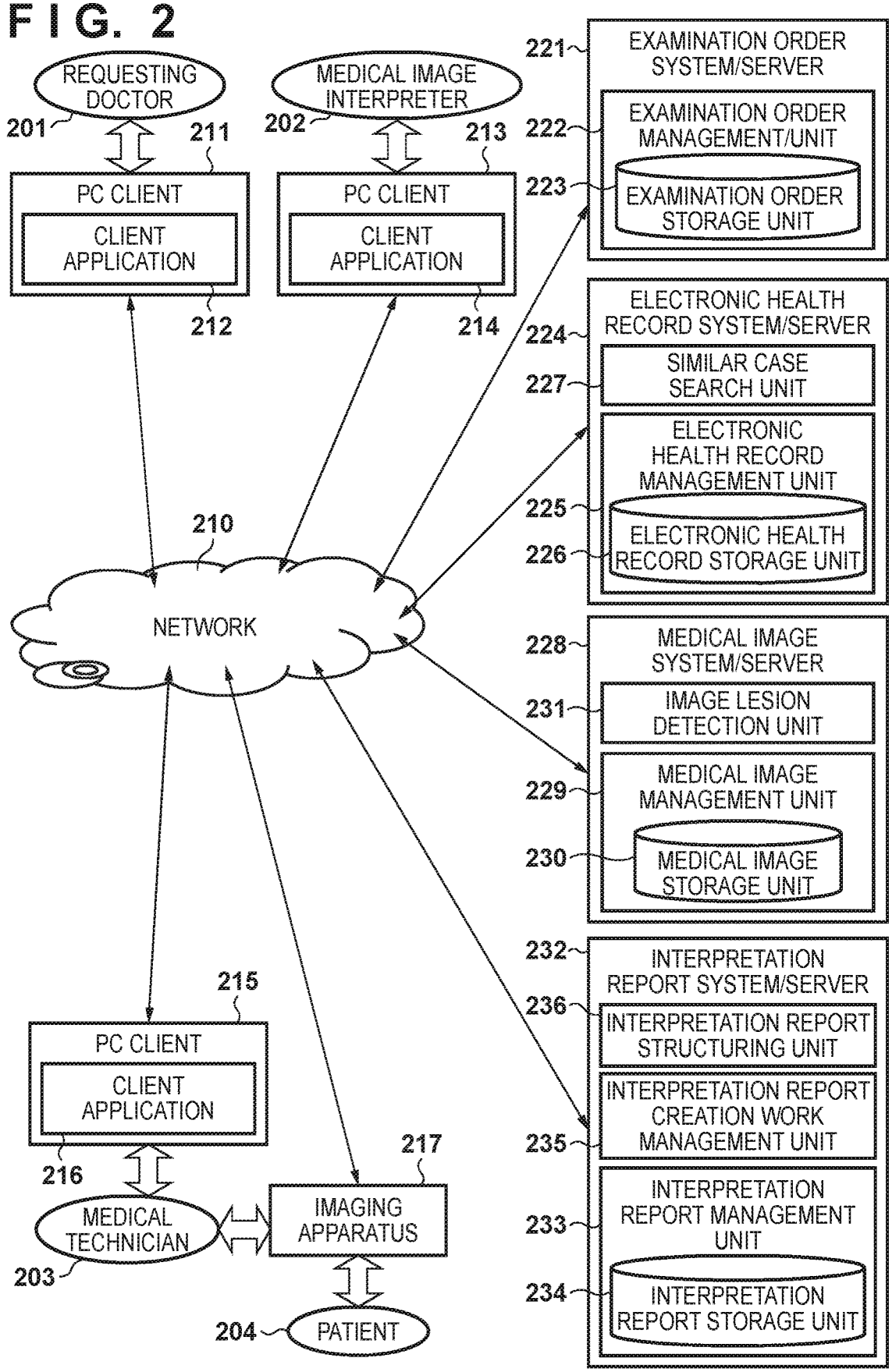
FIG. 2 is a block diagram showing a schematic arrangement of an information processing system according to the embodiment.

FIG. 2 is a block diagram showing a schematic arrangement of an information processing system according to the embodiment. In this embodiment, on the premise of such an environment, a doctor performs image diagnosis by using medical images such as CT and MRI images, and summarizes and writes the diagnosis result as an interpretation report. The information processing technique according to this embodiment provides an input support function in this case.

For the sake of simplicity, the following will exemplify a case in which a text is written in an interpretation report. However, the information processing technique according to this embodiment can be applied to even a case in which an interpretation report is written in the text in an electronic health record and managed together, in the same manner except for a writing target and a management system.

Both a requesting doctor 201 and a medical image interpreter 202 are doctors. The requesting doctor 201 is a clinician who works in an area or field in which he/she actually takes care of a patient and has specialty in internal medicine or surgery. However, the doctor requests to obtain and interpret medical images such as CT and MRI images, and hence will be called a requesting doctor hereinafter. The medical image interpreter 202 is a radiologist who interprets CT images, MRI images, and the like.

A medical technician 203 is in charge of performing, for example, CT and MRI imaging procedures. When performing such imaging, the medical technician 203 obtains images of a patient 204 by using an imaging apparatus 217 for examination images, such as a CT or MRI apparatus. The requesting doctor 201, the medical image interpreter 202, and the medical technician 203 respectively use work PC clients (PC clients 211, 213, and 215) to perform their own desired tasks by using functional configurations on various servers. This embodiment exemplifies a case in which information processing apparatuses such as personal computers are used as the configurations of the PC clients 211, 213, and 215. However, the embodiment is not limited to this example. For example, a personal computer, tablet terminal, smartphone, cellular phone, or the like can be used as each PC client. Alternatively, a plurality of these devices can be used. Furthermore, each device can be used in combination with various types of devices. Any usage type allows a client application which operates in cooperation with a functional configuration on a desired server to operate on the PC client so as to communicate and cooperate with the functional configuration, thereby providing a desired function to each user.

When using various types of devices, each device has the internal arrangement in FIG. 1. Each device is then connected to a network 210 via the communication apparatus 107 to communicate with various servers. When using functional configurations on servers, the PC clients 211, 213, and 215 operate client applications 212, 214, and 216 corresponding to the functional configurations. Each of the client applications 212, 214, and 216 is installed in the external storage apparatus 106 or the ROM 102 in FIG. 1 in advance or downloaded from a corresponding server via the communication apparatus 107 and a network 210 and installed.

The PC clients 211, 213, and 215 load the client applications 212, 214, and 216 into the RAMs 103 and operate them by using the CPUs 101 and the like. This makes the client applications 212, 214, and 216 communicate and cooperate with the respective servers via the communication apparatuses 107 and the network 240, thereby providing the functions of the respective servers to the users.

For example, an operation instruction or operation intent such as a graphics, speech, or character input obtained from each user using the input apparatus 104 is transferred to a corresponding server. Likewise, a result or information provided by each server upon communication with the server side is provided to a corresponding user (the requesting doctor 201, the medical image interpreter 202, or the medical technician 203) by using the display apparatus 109. Likewise, the imaging apparatus 217 is also connected to the network 210, and settings and obtained images in the imaging apparatus 217 are provided to the respective servers and the PC clients 211, 213, and 215 via the network 210.

An examination order system/server 221 is a server which is used to perform an examination. The examination order system/server 221 provides a function of registering, accumulating, referring to, sharing, instructing, and managing examination order information from the requesting doctor 201 to medical staff by using an examination order management unit 222. In practice, upon receiving an examination instruction and its contents from the requesting doctor 201, the examination order system/server 221 registers them as an examination order in an examination order storage unit 223. The examination order system/server 221 then manages the examination order and notifies/provides the examination order to the medical technician 203 and the medical image interpreter 202. In addition, upon completion of the examination, the examination order management unit 222 receives the examination result and stores it in the examination order storage unit 223 or stores information cooperating the examination result to a server which provides the examination result in the examination order storage unit 223 so as to allow the requesting doctor 201 to use the examination result. The examination order storage unit 223 stores an examination order as information used by the examination order system/server 221.

In addition, the examination order management unit 222 can, for example, assign and manage a schedule for the use of examination equipment including the imaging apparatus 217 for examination images and examination technicians in charge/schedules. In this case, for example, the examination order management unit 222 presents usable examination equipment and the vacant schedules of examination technicians in response to the input of an examination input/contents from the requesting doctor 201, and, for example, assigns examination equipment to be used and examination technicians in charge.

An electronic health record system/server 224 is a server which accumulates, manages, and provides electronic health records. The electronic health record system/server 224 provides a function of accumulating, writing, referring to, sharing, and managing electronic health record information by using an electronic health record management unit 225.

The electronic health record system/server 224 accumulates and manages electronic health record information for each patient, which is written by the requesting doctor 201 or related medical staff, and manages the electronic health record information so as to share the information among doctors and medical staff. An electronic health record storage unit 226 stores electronic health record information as information to be used by the electronic health record management unit 225.

A similar case search unit 227 searches various pieces of past case information associated with medical care for similar cases and provides the search result to medical staff including the requesting doctor 201 and the medical image interpreter 202 by using that a large amount of case information is accumulated in the electronic health record storage unit 226. In addition, the similar case search unit 227 can not only search for a similar case but also provide past actual electronic health record information or the like as a concrete example of the similar case.

A medical image system/server 228 is a server which accumulates, manages, and provides medical images. The medical image system/server 228 provides a function of accumulating, writing, referring to, sharing, and managing medical images by using a medical image management unit 229. In practice, the medical image system/server 228 accumulates medical images obtained by operations performed by the medical technician 203 or externally input medical images, and shares the accumulated medical images among related medical staff including the requesting doctor 201 and the medical image interpreter 202 so as to allow them to refer to the medical images. A medical image storage unit 230 stores medical image information to be used by the medical image management unit 229.

An image lesion detection unit 231 has a function of automatically recognizing and detecting a lesion area posing a problem in a medical image by applying a medial image processing technique and an image recognition technique. The image lesion detection unit 231 also provides information such as the position, size, properties, and the like of the lesion area. The medical image system/server 228 can also provide a function of processing medical images, such as performing image processing for enhancing a specific image feature portion and spatially reconstructing images of the same portion which are obtained at different times and spatially sliced images.

An interpretation report system/server 232 is a server which accumulates, manages, and provides interpretation reports. The interpretation report system/server 232 provides a function of creating, registering, accumulating, managing, referring to, and sharing interpretation reports created by the medical image interpreter 202 by using an interpretation report management unit 233. An interpretation report storage unit 234 stores an interpretation report as information used by the interpretation report management unit 233.

An interpretation report creation work management unit 235 performs, for the medical image interpreter 202, work support associated with interpretation report creation, such as assigning interpretation report creation work, holding/managing a work state, and providing work progress information.

An image obtained by the imaging apparatus 217 is stored in the medical image storage unit 230 via the network 210. The medical image interpreter 202 interprets this image and writes the result in an interpretation report, thus allowing the requesting doctor 201 to refer to the result. A cooperation operation at the time of execution of a workflow associated with this interpretation report will be described in detail later.

An interpretation report structuring unit 236 as a feature of the present invention is used when the interpretation report system/server 232 provides a function of creating an interpretation report. In this case, a function of supporting the creation of an interpretation report is implemented by obtaining/structuring an important information written portion from the written contents of an interpretation report. The interpretation report structuring unit 236 will be described in detail later.

In this embodiment, the respective servers including the examination order system/server 221, the electronic health record system/server 224, the medical image system/server 228, and the interpretation report system/server 232 are formed from server type computers (information processing apparatuses). It is also possible to implement a functional configuration of each server by making a plurality of computers cooperate with each other via a network, the Internet, or the like. The internal arrangement of each server is the same as, for example, the internal arrangement described with reference to FIG. 1.

Each server is connected to the network 210 via the communication apparatus 107 to communicate with a client application (212, 214, 216, or the like) on a PC client (211, 213, 215, or the like) corresponding to the functional configuration of each server.

An application program which implements processing by the functional configuration (222, 225, 227, 229, 231, 233, 235, 236, or the like) of each server can be installed in the external storage apparatus 106 or the ROM 102 in FIG. 1 or obtained by being downloaded via the communication apparatus 107 and the network 240. This program is loaded into the RAM 103 to be operated by using the CPU 101 and the like. With this operation, the functional configuration of each server communicates and cooperates with each PC client or client application via the communication apparatus 107 and the network 240, thereby providing the function of the functional configuration of each server. With this operation, a user's operation instruction or operation intent is transmitted from the PC client or client application to each server, and the result or information obtained by the operation of the functional configuration provided by the server is transmitted to the PC client or client application.

A workflow associated with processing of an interpretation report will be described next. First of all, when the requesting doctor 201 diagnoses the patient 204, a medical image such as a CT or MRI image is obtained. When the requesting doctor 201 wants to refer to an interpretation report as an interpretation result, he/she generates a corresponding examination order. The requesting doctor 201 generates this examination order by writing the content of the examination order such as a target patient and the contents/method of imaging on the PC client 213 by using a client application corresponding to the examination order management unit 222.

The written contents are transmitted to and managed by the examination order management unit 222 via the network 210, as imaging instruction information, and accumulated in the examination order storage unit 223. Thereafter, the examination order management unit 222 transmits the imaging instruction information from the requesting doctor 201 to the medical technician 203 who is in charge of imaging, as needed. The medical technician 203 can execute this transmission by using a client application corresponding to the examination order management unit 222 on the PC client 215. Note that it is also possible to perform this transmission by making the examination order management unit 222 transmit the imaging instruction information to the PC client 215 of the medical technician 203.

The medical technician 203 then obtains an image of the designated patient 204 by using the designated imaging apparatus 217 and the designated imaging method based on the content of the examination order. The medical image as this imaging result is sent to the medical image management unit 229 via the network 210 and registered and accumulated in the medical image storage unit 230. At the same time, the examination order management unit 222 is notified of information indicating the completion of imaging based on the examination order and management information registered in the medical image storage unit 230. This updates the contents of the corresponding examination order stored in the examination order storage unit 223. Since the examination order requests for an interpretation report about the obtained medical image, the examination order management unit 222 transmits interpretation instruction information to the medical image interpreter 202 in charge of interpretation. The medical image interpreter 202 can execute this transmission by using a client application corresponding to the examination order management unit 222 on the PC client 213. Note that it is also possible to perform this transmission by making the examination order management unit 222 transmit interpretation instruction information to the PC client 213 of the medical image interpreter 202.

The medical image interpreter 202 interprets the medical image based on the designated interpretation instruction information based on the content of the examination order. The medical image interpreter 202 can identify and refer to the corresponding medical image among the medical images stored in the medical image storage unit 230 based on the examination order information. The medical image interpreter 202 can also refer to the corresponding electronic health record of the patient 204 among the electronic health records stored in the electronic health record storage unit 226 based on the patient information of the examination order information. In addition, the examination order management unit 222 and the interpretation report management unit 233 can register an interpretation report recording the interpretation result corresponding to the examination order in the interpretation report storage unit 234.

The medical image interpreter 202 creates an interpretation report about the patient by performing interpretation (image diagnosis) and writing the result based on information such as the medical image indicated by the examination order and the electronic health record. The interpretation report management unit 233 then registers the created interpretation report in the interpretation report storage unit 234. When the interpretation report is registered in the interpretation report storage unit 234, registration notification information indicating the completion of registration is notified to the examination order management unit 222. Upon receiving the registration notification information, the examination order management unit 222 updates the examination order information. This makes it possible to refer to the interpretation report corresponding to the medical image of the corresponding patient. The medical image interpreter 202 can execute this processing by using client applications corresponding to the examination order management unit 222, the medical image management unit 229, and the electronic health record management unit 225 on the PC client 213. When creating an interpretation report, the medical image interpreter 202 uses the interpretation report structuring unit 236 as a feature of this embodiment. This will be described in detail later.

The above processing makes it possible to use the interpretation report requested by the requesting doctor 201. The examination order management unit 222 notifies the requesting doctor 201 that he/she can use the interpretation report. The requesting doctor 201 performs this notification to himself/herself by using a client application corresponding to the examination order management unit 222 on the PC client 211.

With the above procedure, each client PC, each client application, and each server operate in cooperation with each other. The requesting doctor 201 can obtain a necessary medical image and a corresponding interpretation report, and hence can perform comprehensive diagnosis based on electronic health record information and information of other examinations in addition to the above information.

Figure 3:
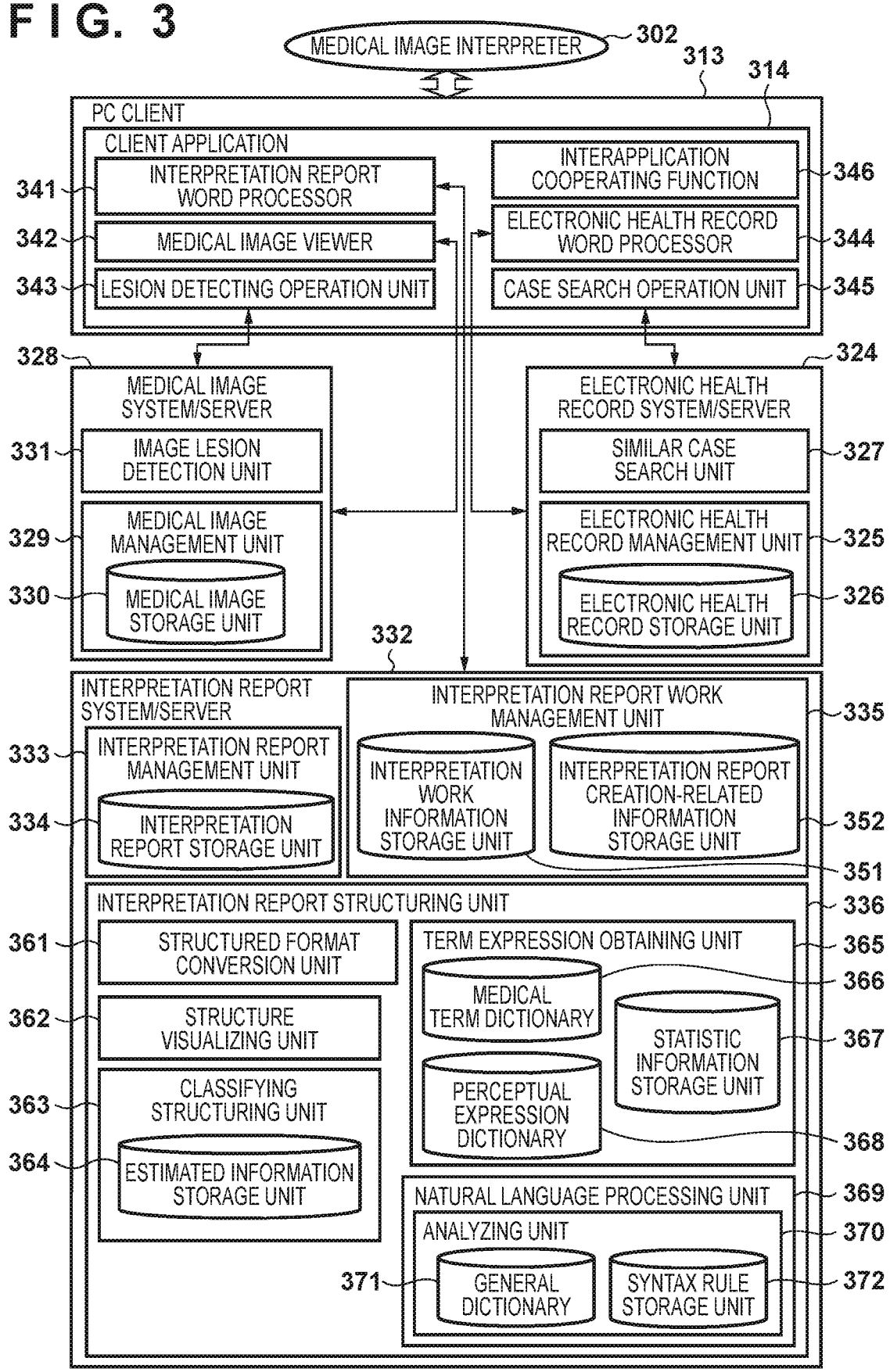
FIG. 3 is a block diagram schematically showing a functional configuration for creating an interpretation report and creation supporting according to the embodiment.

FIG. 3 is a view schematically showing a functional configuration for creating an interpretation report and supporting the creation according to this embodiment. Referring to FIG. 3, components from a medical image interpreter 302 to an interpretation report structuring unit 336 are identical to those from the medical image interpreter 202 to the interpretation report structuring unit 236 in FIG. 2, and hence a description of them will be omitted. Note however that an illustration of components unnecessary for the description made with reference to FIG. 3 is omitted, and hence some components shown in FIG. 2 are omitted in FIG. 3.

Client applications 314 to 345 on a PC client 313 correspond to the functional configurations of the respective servers, and are client applications used for interpretation. An interapplication cooperating function 346 makes these client applications cooperate with each other. The interapplication cooperating function 346 enables transmission/reception of data between various types of client applications used for interpretation and the use of functions provided by the client applications.

Components from an electronic health record system/server 324 to an electronic health record storage unit 326 are identical to those from the electronic health record system/server 224 to the electronic health record storage unit 226 in FIG. 2, and include a system/server related to electronic health records and a functional configuration provided by it. A doctor as a user can browse the electronic health records of patients stored in the electronic health record storage unit 326 and revise/edit electronic health records by using the function of an electronic health record management unit 325 via an electronic health record word processor 344 (electronic health record generation unit).

A similar case search unit 327 provides a search function for a doctor as a user by using that the electronic health record management unit 325 stores a large amount of electronic health records in the electronic health record storage unit 326. In this case, the similar case search unit 327 searches electronic health records stored in the electronic health record storage unit 326 according to search information such as a designated keyword, term, or medical image/examination data as a search input. The similar case search unit 327 searches for a case corresponding to search information, a similar case having a predetermined similarity to a case corresponding to search information, or a written portion of an electronic health record which corresponds to the medical care information of a patient. The medical image interpreter 302 performs a search by the similar case search unit 327 on the PC client 313 by using a case search operation unit 345 as a client application corresponding to the similar case search unit 327. This can provide information for supporting diagnosis to the doctor and allows the doctor to search for or refer to an electronic health record in which diagnosis contents are written.

Components from a medical image system/server 328 to a medical image storage unit 330 are identical to those from the medical image system/server 228 to the medical image storage unit 230 in FIG. 2, and include the medical image system/server 328 and a functional configuration provided by it. A doctor as a user can, for example, browse a medical image of a patient stored in a medical image storage unit 330 via a medical image viewer 342 by using a medical image management unit 329. Since a medical image holds information concerning the actual size of an imaging target, the doctor can obtain measurement information indicating the actual size of a specific portion such as a lesion by performing the operation of measuring the length, size, and the like of the specific portion on the medical image. The medical image interpreter 302 performs this processing by using the medical image viewer 342 as a client application corresponding to the medical image management unit 329 on the PC client 313. This can provide a medical image to the doctor and allows the doctor to refer to measurement information such as a position or region of interest on the medical image and the size of the region. In addition, in this embodiment, the measurement information measured by the medical image viewer 342 is transferred to an interpretation report word processor 341 (interpretation report generation unit) via the interapplication cooperating function 346 so as to be handled as input information to an interpretation report.

In addition, an image lesion detection unit 331 provides lesion candidate information in a medical image to a doctor as a user by using that the medical image management unit 329 stores a large amount of medical images in the medical image storage unit 330 and medical images include the positions and regions of lesions and characteristic/feature amounts on the medical images. In this case, the doctor performs the operation of designating a medical image and a specific region in the medical image. The image lesion detection unit 331 obtains a characteristic/feature amount on the medical image based on the input of this designating operation, and searches for a medical image having a characteristic/feature amount on the medical image which is similar to the above characteristic/feature amount or a specific portion or region in the medical image. The medical image interpreter 302 performs this search processing by using a lesion detecting operation unit 343 as a client application corresponding to the image lesion detection unit 331 on the PC client 313. This can provide information for supporting diagnosis to the doctor and allows him/her to refer to, for example, measurement information such as a position or region of interest on the medical image, based on which diagnosis has been performed, and the size of the region.

Components from an interpretation report system/server 332 to an interpretation report structuring unit 336 are identical to those from the interpretation report system/server 232 to the interpretation report structuring unit 236 in FIG. 2, and includes the interpretation report system/server 332 and a functional configuration provided by it. An interpretation report management unit 333 accumulates an interpretation report which has been or being created in an interpretation report storage unit 334 and provides a function of creating, registering, accumulating, managing, referring to, and sharing the interpretation report. The medical image interpreter 302 as a user inputs an interpretation report by using the interpretation report word processor 341. The interpretation report management unit 333 manages the contents of the report. The report is recorded on the interpretation report storage unit 334.

An interpretation report work management unit 335 provides a function of supporting work associated with interpretation report creation such as interpretation report creation work assignment/work notification and work process management. The interpretation report work management unit 335 provides a function for the management of interpretation report creation, such as work sharing on an interpretation report basis or work sharing for assigning priority to interpretation report creation work in order of emergency, when there are a plurality of medical image interpreters 302 or it is necessary to create many interpretation reports. An interpretation work information storage unit 351 records and accumulates information concerning a creation work state for each interpretation report.

In addition, an interpretation report information storage unit 352 stores and accumulates information about state management of an interpretation report under creation and work/display contents of the interpretation report word processor 341 under operation. If, for example, interpretation report creation work by the interpretation report word processor 341 is interrupted midway, information concerning the work/display contents of the interpretation report word processor 341 under operation is stored in the interpretation report information storage unit 352.

When restarting interpretation report work after the interruption of the work, the interpretation report word processor 341 reads out the information stored in the interpretation report information storage unit 352, and restores the work environment/display contents on the interpretation report word processor 341. Information stored in the interpretation report information storage unit 352 is information indicating the work state of an interpretation report for each medical image interpreter 302 as a user. The interpretation report work management unit 335 can support interpretation report creation work by using these pieces of information.

The interpretation report structuring unit 336 provides a function of supporting interpretation report creation by obtaining a written portion of important information from the written contents of an interpretation report and structuring the written contents. A classifying structuring unit 363 of the interpretation report structuring unit 336 provides a function of obtaining specific information and its written portion from a text (medical text) written in a medical document such as an interpretation report, classifying written contents, and structuring the written contents.

The classifying structuring unit 363 uses information stored in an estimated information storage unit 364, results obtained by a term expression obtaining unit 365, and a processing result obtained by a natural language processing unit 369 to perform medical text information classifying/structuring. Obtaining processing by the term expression obtaining unit 365 and processing by the natural language processing unit 369 will be described in detail later.

A structure visualizing unit 362 provides a function of displaying the contents of a structuring result obtained by the classifying structuring unit 363 to a user. The visualization result obtained by the structure visualizing unit 362 is displayed on the interpretation report word processor 341 to allow the use of it.

A structured format conversion unit 361 converts the recording format of a medical text so as to hold a structuring result obtained by the classifying structuring unit 363. In this case, the recording format of a medical text is that determined by unique or public specifications for electronic health records, interpretation reports, or the like. This recording format may be a combination or mixture of such recording formats. Texts such as interpretation reports converted into the recording format are accumulated and managed in the interpretation report storage unit 334. In addition, the PC client 313 can obtain an interpretation report from the interpretation report storage unit 334 in response to an instruction from the supporting portion 314 or the interpretation report word processor 341 of the user.

The term expression obtaining unit 365 provides a function of obtaining linguistic expressions such as medical terms appearing in a processing result obtained by the natural language processing unit 369 and words and expressions as supplementary expressions of the medical terms. The classifying structuring unit 363 performs information classifying and structuring processing based on a processing result as information concerning the medical terms and supplementary expressions of them obtained by the term expression obtaining unit 365. The term expression obtaining unit 365 holds a medical term dictionary 366 which holds information about notation character strings, expression patterns, and the like of medical terms such as the names of abnormal portions, lesion names, and disease names on images. The term expression obtaining unit 365 uses the medical term dictionary 366 to obtain medical terms.

In addition, the medical term dictionary 366 holds information about notation character strings, expression patterns, and the like concerning the contents and states of the names of abnormal portions, lesion names, disease names, and the like on images, that is, terms of supplementary expressions such as degrees, sizes, and shapes. The term expression obtaining unit 365 uses the medical term dictionary 366 to obtain supplementary expressions.

The term expression obtaining unit 365 holds a statistic information storage unit 367 which stores information (medical term co-occurrence pattern statistic information) indicating the co-occurrence of specific words and expressions when medical terms appear in actual texts. The term expression obtaining unit 365 estimates terms upon appearance of unknown medical terms and supplementary expressions by using information stored in the statistic information storage unit 367.

In addition, the term expression obtaining unit 365 obtains perceptual expressions including "exists" and "is seen" which indicate existence and confirmation of existence, "is recognized" and "thinks that" which indicate thinking, judgement, and the like, "please try to" and "please do" which indicate a demand and request, and expressions indicating negation. The term expression obtaining unit 365 holds a perceptual expression dictionary 368 holding information for obtaining perceptual expressions. The term expression obtaining unit 365 uses the perceptual expression dictionary 368 to obtain perceptual expressions from texts.

The natural language processing unit 369 is a processing unit which analyzes medical texts. The natural language processing unit 369 has an analyzing unit 370 as a processing unit which analyzes texts. The analyzing unit 370 performs morphological analysis to obtain terms used in texts on a word basis and syntax analysis to analyze the modification relations between words. Morphological analysis is analysis processing for obtaining the original notations of words such as original or basic forms by dividing character strings in texts, classifying the words into part of speech, and removing conjugation, inflection, and the like. This analyzes a text into the form of word strings. The analyzing unit 370 uses a word dictionary (general dictionary 371) to perform morphological analysis processing. Syntax analysis is analysis processing for analyzing and obtaining relations and structures such as the syntax, modification relation, and the like of a word string obtained as a result of morphological analysis by using information such as grammar information with respect to the word string. Syntax analysis converts the word string into a form such as a tree structure (syntax tree) of words based on the syntax or a modification network structure (modification relation). The term expression obtaining unit 365 performs the processing of obtaining medical terms and supplementary expressions based on the analysis result obtained by the natural language processing unit 369. With the above arrangement, the information processing apparatus (system) creates an interpretation report and supports the creation. The medical image interpreter 302 as a user uses the electronic health record word processor 344 to browse/obtain the electronic health record information of a patient by using the electronic health record management unit 325. In addition, the medical image interpreter 302 can refer to similar past cases by making the similar case search unit 327 perform a similar case search using the case search operation unit 345 based on the obtained information, thereby obtaining information concerning the condition of the patient or a suspicious disease.

To perform image diagnosis, the medical image interpreter 302 then uses the medical image viewer 342 to perform image diagnosis by obtaining and browsing obtained medical images using the medical image management unit 329. In this case, the medical image interpreter 302 can measure the position, size, and the like of a lesion of interest and obtain information concerning the lesion by using the medical image viewer 342. In addition, the medical image interpreter 302 can obtain the information of a result of automatically detecting a lesion on an obtained medical image by using the image lesion detection unit 331 via the lesion detecting operation unit 343. When performing image diagnosis based on the information obtained in this manner and writing the result as an interpretation report, the medical image interpreter 302 uses the interpretation report word processor 341 to write and edit the result, and records the result in the interpretation report management unit 333.

In addition, as needed, it is possible to refer to a past interpretation report about the patient or compare a plurality of interpretation reports about the patient with each other by using the interpretation report word processor 341 and the interpretation report management unit 333. In this case, it is also possible to refer to a past medical image (when the interpretation report was written, in particular) or compare a plurality of medical images with each other by using the medical image viewer 342 and the medical image management unit 329. Work contents at the time of writing and editing with the interpretation report word processor 341 are recorded in the interpretation report work management unit 335. With this operation, when, for example, the work is interrupted or restarted, the interpretation report word processor 341 can reproduce/restart a work situation corresponding to the interpretation report under work by obtaining the information recorded in the interpretation report work management unit 335.

According to the arrangement of this embodiment, an interpretation report is written by using the interpretation report structuring unit 336 via the interpretation report word processor 341. Alternatively, structuring the written contents of a past interpretation report under reference can display an interpretation report in an eye-friendly manner.

In addition, recording a structured interpretation report and providing it to other devices and the like can facilitate the reuse of the written contents. Furthermore, it is possible to reuse measurement results obtained by the medical image viewer 342, results obtained by the lesion detecting operation unit 343 and the image lesion detection unit 331, and similar cases and corresponding written texts such as electronic health records detected by the case search operation unit 345 and the similar case search unit 327.

According to a conventional text information reuse method, simple text information which has already been written is used by being copied to a new medical document or interpretation report. In addition, after the text information is copied to the interpretation report or the like, the corresponding text which is the copied text information is used, as needed, by editing (modifying/revising) its portions different from a currently written text. Copying and editing text information in this manner depend on the linguistic expression form of the text information; it is necessary to perform copying/editing (modifying/revising) in consideration of the linguistic expression form. The information processing apparatus according to this embodiment performs such copying and editing (modifying/revising) in a state in which the morphemes of information itself which is written in a text as text information are structured, instead of depending on the linguistic expression form. This facilitates taking in the information of a text when reusing it, and makes it possible to display the text in an eye-friendly manner or provide the text to other devices by recording the text in a structured state. The following is a detailed description of an implementation method when structuring a text as text information and a method of using it.

Figure 4:
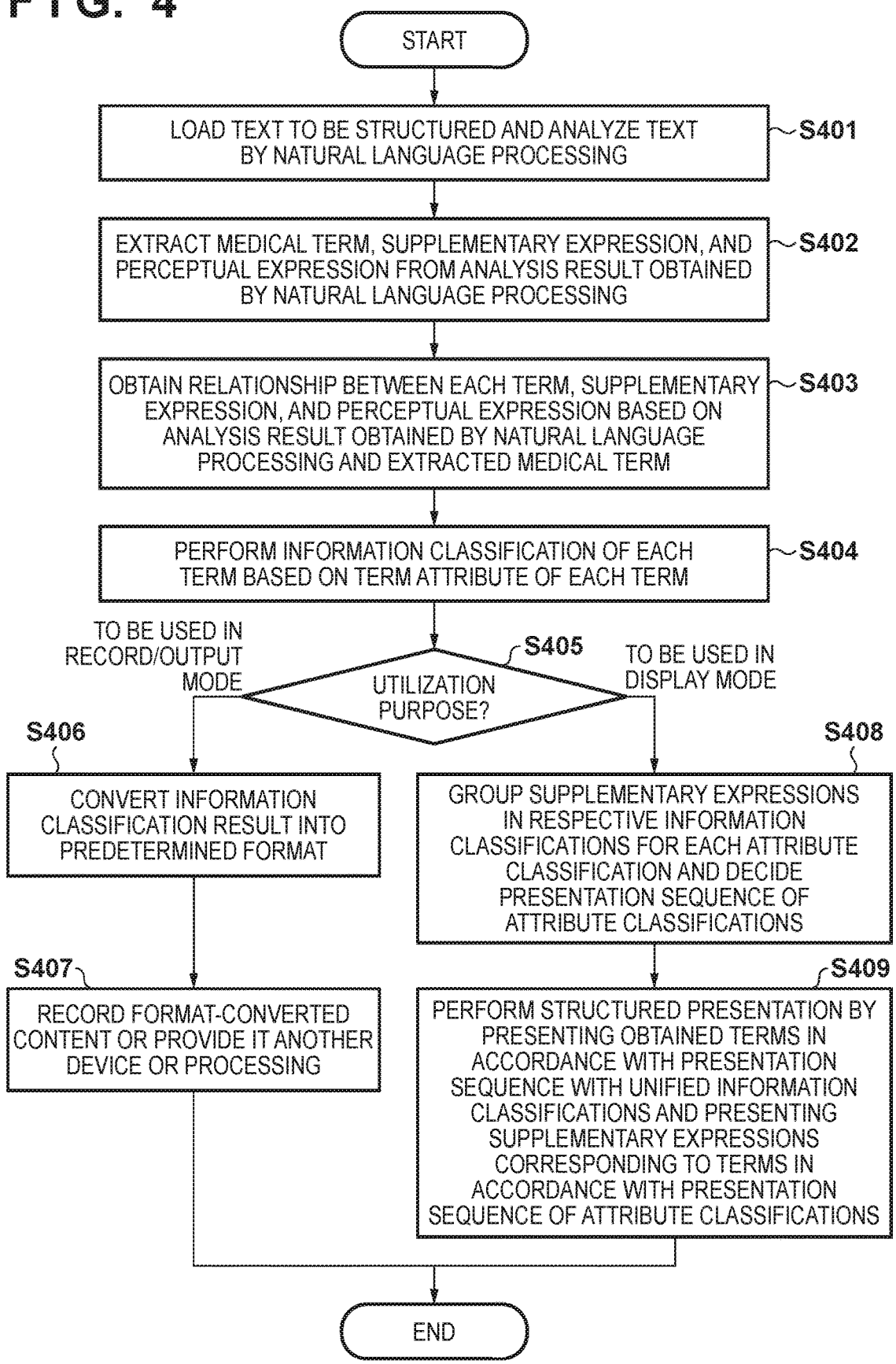
FIG. 4 is a flowchart for explaining a procedure for information processing according to the embodiment.

FIG. 4 is a flowchart for explaining a procedure for information processing with respect to a text according to this embodiment. In step S401, a text to be structured is read and analyzed by natural language processing. The natural language processing unit 369 in FIG. 3 performs this processing. The text to be structured is, for example, a text in an interpretation report. Assume that the medical image interpreter 302 in FIG. 3 is seeing information written in a natural language in an interpretation report about a patient. The text in the interpretation report which is to be handled here may be a past interpretation report about the patient or another interpretation report as a reference. Alternatively, this text may be the contents of a text output from the lesion detecting operation unit 343 and the image lesion detection unit 331 or a text as a search result obtained by the electronic health record word processor 344, the electronic health record management unit 325, the case search operation unit 345, or the similar case search unit 327.

Assume that the text (text data) in FIG. 5A is used as an example of a text in an interpretation report for a description of this embodiment. FIG. 5B shows processing results in steps S401 and S402 in a summarized form.

Referring to FIG. 5B, the "description" column indicates the text example in FIG. 5A divided word by word by morphological analysis. In addition, "part of speech" information is assigned to each description by morphological analysis. The output result obtained by morphological analysis has been described so far. In addition, with regard to the output result obtained by morphological analysis, "syntax structure" information is written for each description, which is an output result obtained by syntax analysis. The syntax structure according to this embodiment is output mainly based on a phrase structure. For this reason, the information in "syntax structure" includes portions forming basic units of phrases such as noun phrases and verb phrases, postpositional phrases and the like, and postpositional phrases and the like which can have relations with other phrases. The example shown in FIG. 5B shows an example holding a two-layer syntax structure. In addition, relations such as modifications and main verb phrases as syntactically main phrases are also obtained. Note that in Japanese, a particle appears immediately after a noun (phrase) to have a syntactic relation with another noun phrase or verb phrase. For this reason, such a particle is expressed as a postposition, and a noun phrase or the like accompanied with it is expressed as a postpositional phrase. Such a postpositional phrase is sometimes called a segment or the like.

The natural language processing unit 369 performs processing in this manner. When performing this processing, the natural language processing unit 369 uses the general dictionary 371 holding words as single words and word information and a syntax rule storage unit 372 holding combinations of words constituting phrase structures and relations/structures between phrase structures. The analyzing unit 370 uses these components to divide a target text into words and assign information such as part of speech to them and to assemble them into a syntax structure. The basic processing schemes of morphological analysis and syntax analysis and the basic form of processing results have been described individually. When describing in detail, however, there are various schemes and forms. This embodiment can adopt any of them as long as corresponding processing and processing results can be used.

When the processing in step S401 is complete, the process advances to step S402. In step S402, processing is performed to obtain medical terms, supplementary expressions, and perceptual expressions from the analysis result obtained by the natural language processing unit in step S401. The term expression obtaining unit 365 obtains terms appearing in the text, supplementary expressions corresponding to the terms, and perceptual expressions corresponding to the terms and the supplementary expressions based on the morphological analysis and syntax analysis results and dictionary data. The results obtained by this processing are included in FIG. 5B, and are indicated in the "term", "supplementary expression", and "perceptual expression" columns. As "term" information, information belonging to categories such as region name, lesion/abnormality name, and disease is obtained with respect to descriptions. As "supplementary expression" information, information belonging to categories such as shape and size and subcategories such as concreteness is obtained with respect to descriptions. As "perceptual expression" information, information corresponding to direct expressions of visual perception, recognition/possibility, and the like such as "considered", "seen", and "suspected" and information belonging to categories such as expression of confirmation of existence (presence/absence) including "exists" and "accompanied" are obtained with respect to descriptions and combinations of them. In this manner, the term expression obtaining unit 365 performs processing. When performing this processing, the term expression obtaining unit 365 uses the medical term dictionary 366 holding information such as medical terms, their supplementary expressions, and the like. The term expression obtaining unit 365 uses co-occurrence patterns of medical terms and supplementary expressions and statistic information (medical term co-occurrence pattern statistic information) of relations between the co-occurrence patterns, which are in the statistic information storage unit 367. In addition, the term expression obtaining unit 365 uses the perceptual expression dictionary 368 holding perceptual expression information. The term expression obtaining unit 365 performs the processing of finding information corresponding to medical terms, supplementary expressions of the medical terms, and perceptual expressions by using these pieces of information and classifying them into the respective categories. As a technique of obtaining/estimating these terms, supplementary expressions, and perceptual expressions, a simple method of obtaining the expressions by matching with a dictionary is available. There are available various other types of methods including a method of estimating corresponding expressions by using the description arrangements of the expressions themselves and other words which co-occur with the expressions using statistic information and the like, even if the expressions are not registered in any dictionaries. The forms of processing results are often basically the same as those described above individually. When describing in detail, however, there are various forms. This embodiment can adopt any of them as long as corresponding processing and processing results can be used.

When the processing in step S402 is complete, the process advances to step S403. In step S403, the processing of obtaining the relations between the respective terms, supplementary expressions, and perceptual expressions is executed based on the analysis result obtained by the natural language processing unit 369 and the obtained medical terms. FIG. 6A exemplarily shows a processing result of obtaining the relations between the respective terms, supplementary expressions, and perceptual expressions. FIG. 5B is a view showing results obtained by performing the natural language processing in step S401 and obtaining the medical terms, the supplementary expressions, and the perceptual expressions in step S402. FIG. 6A shows a result generated by reconstructing these expressions in step S403. The following are the contents of the reconstruction.

The contents of the "term expression" column in FIG. 6A are a result of summarizing character strings of descriptions as units obtained as terms, supplementary expressions, and perceptual expressions in FIG. 5B. The contents of the "term attribute" in FIG. 6A are a result of summarizing the categories of the terms written in the "term" column in FIG. 5B again. The contents of the "supplementary expression attribute" column in FIG. 6A are the categories of the supplementary expressions written in the "supplementary expression" column in FIG. 5B. The contents of the "supplementary expression value/state" column in FIG. 6A are a result of summarizing character strings of descriptions in FIG. 5B which correspond to "supplementary expression attribute". The contents of the "perceptual expression" column in FIG. 6A are shown in a form to which the categories (visual perception and recognition) of perceptual expressions written in the "perceptual expression" column in FIG. 5B are added. The contents of the "perceptual expression" column in FIG. 6A are a result of summarizing the character strings in "description" and the categories (visual perception and recognition) of perceptual expressions in FIG. 5B.

When the processing in step S403 is complete, the process advances to step S404. In step S404, information classification is performed with respect to the respective terms, supplementary expressions, and perceptual expressions based on the term attributes of the respective terms, the supplementary expression attributes of the supplementary expressions, and the like. FIG. 6B shows this processing result. In this case, it is estimated which expressions correspond to the "classification" item or the "details" item in "information classification" based on information like that shown in FIG. 6A, which is the result obtained in step S403.

Referring to FIG. 6B, in "information classification", "classification" includes four categories including observation, finding, diagnosis, and plan/request. In addition, "classification" includes "others" as a category. Each of these categories holds the subcategory "details". FIG. 6A merely shows a result of, for example, obtaining terms from the written contents based on the syntax structure of the text and an appearance order of terms. In contrast to this, FIG. 6B shows an example of classification based on written contents associated with a result of analyzing a medical image. For example, information is classified into contents considering a description about observation results (analysis results) with respect to an image, a description about findings associated information of a phenomenon, abnormality, or lesion which has actually occurred in the body of the patient, a description about determination/diagnosis result such as a disease name or the like conceivable as a finding result, and a description about a future planning instruction/request or the like obtained based on a diagnosis result. They respectively correspond to observation, finding, diagnosis, and plan/request in "classification" in FIG. 6B.

The respective terms, supplementary expressions, and perceptual expressions are re-classified, if there are at least four written categories, from a viewpoint of which written categories are adequate for classification. The result corresponds to "classification" and "details" of "information classification" in FIG. 6B. When comparing FIG. 6A with FIG. 6B, a density as a concrete supplementary expression moves into the classification category "observation-image observation" in FIG. 6B. In addition, the greeting sentence "thank you for your help" in FIG. 6A is classified into information belonging to the classification category "greeting" in "others" in FIG. 6B. The processing in steps S403 and S404 is performed in this manner. The classifying structuring unit 363 performs this processing.

FIG. 6B exemplarily shows a result obtained when the classifying structuring unit 363 processes the information in FIG. 6A which is the contents obtained in steps S401 and S402. In this example, with regard to the respective terms, supplementary expressions, and perceptual expressions in FIG. 6A, for example, "image feature name" corresponding to the term expression "low density area" is classified to the category "observation" in FIG. 6B. In addition, the supplementary expressions "about 25 mm" and "soft tissue density" are classified to the category "observation" in FIG. 6B and related to the term expression "low density area" according to a rule that supplementary expressions having concrete supplementary expression attributes concerning size and density become supplementary expression attributes incidental to term expressions belonging to "observation".

In this example, "about 25 mm" is re-classified to "observation". Even if an expression like "about 25 mm" is not related to any specific term and exists independently, classification is performed in the same manner as described above. In steps S401 and S402, terms and supplementary expressions are classified mainly by language processing. In steps S403 and S404, the classification result mainly based on language processing is re-classified based on classification information or relation/structure information based on the usage types of the respective terms and supplementary expressions in the text.

As usage type information, information using any one of the following pieces of information is used: a usage rule that, for example, a term or supplementary expression is used as a meaning belonging to a specific classification such as "observation" in a text in an interpretation report, statistic information based on past texts, especially statistic information indicating a co-occurrence relation with other terms, and the like. The above re-classification of "about 25 mm" is performed by using classification information based on a usage type as a re-classifying rule. The classifying structuring unit 363 classifies expressions with different attributes by using the usage rule of each term, statistic information based on texts created in the past, and statistic information indicating the co-occurrence relation between each term and another term. Relation/structure information is the same information as the above information except that it concerns the relation/structure of terms and supplementary expressions. This information indicates that the probability of co-occurrence between the following in the same text is high: a disease name as a term and a supplementary expression indicating the degree of the disease indicated by the disease name, and that the probability of co-occurrence between the following in the same text is high: a lesion name as a term and a supplementary expression indicating the shape, size, or the like of the lesion. In addition, when handling a specific disease name such as cancer as a term, the above information may indicate, for each term, that the probability of co-occurrence between the term and a supplementary expression such as "so-and-so type" indicating the stage or type of the disease in the same text is high.

Based on such relation/structure, a classification result based on modification structure and modification relation in a text is re-classified based on classification information based on the usage type of the text and relation/structure information. Such classification information based on the usage type of terms and supplementary expressions and relation/structure information are stored in the estimated information storage unit 364. According to this relation/structure information, the descriptions "significant size" and "lobulated" and the like are directly classified to "image finding" in FIG. 6B.

Assume that the estimated information storage unit 364 stores, as information concerning the co-occurrence between terms and perceptual expressions, information indicating that when "examination name" is related to a perceptual expression such as "request", an examination request belonging to "plan/request" exhibits a statistic superiority. This classifies the term "endoscopic examination" as an examination name to "plan/request".

If there is only "request" independently of other terms in particular, the perceptual expression "thank you for your help" is classified to "greeting" according to information concerning the co-occurrence of a term/perceptual expression belonging to "greeting". Note that "greeting" is not included in the classifications "observation", "finding", "diagnosis", and "plan/request" to which importance is placed in this embodiment, "details" corresponding to the classification "others" is classified as "greeting" in FIG. 6B.

In contrast to this, if the relation between a term and a supplementary expression is obtained in steps S401 and S402 and the estimated information storage unit 364 stores no classification information or relation/structure information based on the corresponding usage style, the relation obtained in steps S401 and S402 is used without any change, and the term and the supplementary expression are classified.

Information in the estimated information storage unit 364 is often created based on interpretation reports created in the past and the like. For this reason, when a term and a supplementary expression exhibiting extremely low appearance frequencies or a new term and a new supplementary expression appear, they are often handled in the above manner. If, however, it can be expected that a writer will write such terms and supplementary expressions while using expressions clarifying the relations between them, even this approach may pose no problem. Furthermore, as the use frequency of a given term and supplementary expression increases, corresponding information is additionally stored in the estimated information storage unit 364 in the future. Therefore, it is expected that as the amount of information added increases, corresponding classification information and relation/structure information can be obtained by the processing in steps S403 and S404.

The above description is an example of classifying the text of an interpretation report so as to clarify the written contents, and has exemplified the scheme of separately and continuously performing term/supplementary expression processing and processing of classification information based on the usage types of terms and supplementary expressions and relation/structure information. Even when processing the same medical text, even if classification items such as "observation" remain the same, the details of contents and classification tendency of terms and supplementary expressions to be classified to such classification items can differ because of a difference in text type or a difference in viewpoint between a writer and a reader. This is because the meanings of a term and a supplementary expression sometimes change when the usage of the term and the supplementary expression differs or depending on written contents. In such a case, it is expected that a beneficial effect will be produced by a method combining an obtaining/classifying unit configured to linguistically process terms/supplementary expressions independently of texts as in this embodiment and a classifying unit which gives consideration to a usage which changes depending on texts. However, these schemes can be simultaneous executed. In this case, it is expected that the processing efficiency will be improved by simultaneously obtaining the results shown in FIG. 6B. This embodiment can be applied to either of the schemes.

In addition, although this embodiment has exemplified the creation of an interpretation report, the same effect as that of the embodiment can be expected in fields other than the creation of interpretation reports and medical texts. That is, the written contents or contents for discussion of reports written in a natural language in different manners are presented as information unified in a sequence based on a logical relationship originating from facts. This allows the reader of the reports to easily grasp the contents. Depending on reports to which this technique is applied, terms and supplementary expressions and the like differ. It is therefore necessary to cope with such differences. The same effects as those described above can be expected as long as reports are written with logical contents and information originating from facts and the technique aims at writing about analysis, judgement, and the like or supporting such writing work.

When the processing in step S404 is complete, the process advances to step S405. In step S405, the process branches depending on a utilization purpose. The process branches depending on whether the usage mode is a recording/output mode or a structured presentation display mode. In practice, in the processing in step S405 in FIG. 4, the medical image interpreter 302 has already issued an instruction to record/output or perform structured presentation display by using the interpretation report word processor 341. The process branches in accordance with an instruction from the medical image interpreter 302. If the doctor will use the obtained information in the record/output mode as the usage mode, the process advances to step S406. If the doctor will use the obtained information in the structured presentation display mode as the usage mode, the process advances to step S408.

In step S406, the information classification result is converted into a predetermined format. The structured format conversion unit 361 converts the classification result into a predetermined format, and outputs the classification result in the converted format. FIG. 7 is a view exemplarily showing contents obtained by this format conversion. The format shown in FIG. 7 uses an XML format. The information in FIG. 6B obtained by information classification of the respective terms of the text example shown in FIG. 5A is written in the XML format. The structured format conversion unit 361 performs the processing in this step. The structured format conversion unit 361 converts the information classification result obtained in step S404 into a plurality of structured formats corresponding to output destinations and purposes. When the processing in step S406 is complete, the process advances to step S407. In step S407, the contents obtained by the format conversion are recorded or provided to another device. With this processing, the structured result is added to the text of the interpretation report in the interpretation report storage unit 334 and recorded as structured information via the interpretation report management unit 333. This makes it possible to provide the record to another device or processing. When the processing in step S407 is complete, the processing in FIG. 4 which uses the information classification result in the record/output mode is terminated.

If it is determined in step S405 that the information classification result is used in the display (present) mode, the process advances to step S408. In step S408, the respective supplementary expressions in the respective information classifications are grouped for each attribute classification, and the sequence (unified form) of presentation of attribute classifications is decided. When presenting the information classification result, a display sequence is decided so as to explicitly show strong relevance between identical supplementary expressions like those on the same row or column. This makes it possible to decide an eye-friendly presentation sequence when presenting the respective supplementary expressions. The structure visualizing unit 362 performs this processing. When the processing in step S408 is complete, the process advances to step S409. In step S409, obtained terms are presented in accordance with the presentation sequence (unified form) with unified information classifications, and corresponding supplementary expressions are presented in accordance with the presentation sequence of the attribute classifications, thus performing processing for structured presentation. This decides display contents based on which structured presentation is performed for actual presentation to the user. The structure visualizing unit 362 performs this processing. The interpretation report structuring unit 336 sends this processing result to the interpretation report word processor 341 to display the result and present it to the medical image interpreter 302.

FIG. 8 is a view exemplarily showing display contents on the screen upon performing structured presentation. It is assumed that the PC client in FIG. 2 has a multiwindow display function. FIG. 8 exemplarily shows one of the multiple windows which performs structured display. This window has a window title bar 801, on which the title "structured display" is displayed. Information is displayed on the window in a matrix display form.

A row 802 shows "region". A row 803 displays "observation", "finding", "diagnosis", and "plan/request" corresponding to the information classifications in FIG. 6B. In addition, as items obtained from supplementary expressions, "target", "size", "density", "shape", and "state" are displayed in the column direction. The information written in the term expression fields in FIG. 6B is displayed on the "target" row in FIG. 8. FIG. 8 shows supplementary expressions and perceptual expressions written in correspondence with the row display ("observation", "finding", "diagnosis", and "plan/request") and the column display ("target", "size", "density", "shape", and "state"). For example, the perceptual expressions in FIG. 6B are displayed in forms like "<is considered>" in correspondence with the corresponding terms and supplementary expressions. Since a negative perceptual expression is important information, the word "negation" is displayed in combination with a perceptual expression ("(<<is appeared, no (negation)>>)") so as to discriminate from a case of "recognized".

With regard to "observation" "finding", "diagnosis", and "plan/request" on the information classification row, when the same image observation result is described, a logical relationship (for example, the relationship in the logical proposition that "if P is true, then Q is true") at the time when the medical image interpreter thinks in image diagnosis tends to be established. For this reason, when wanting to know the way of thinking of a medical image interpreter, showing it along the logical relationship sequence of thinking is an easy way to know it. Showing a logical relationship sequence of thinking will clarify, in particular, which type of disease the medical image interpreter finally suspects from information obtained by observing images and the like and how to cope with the disease in the future. This clarifies the way of thinking of the medical image interpreter, for example, the process of logical thinking in the contents/description of interpretation.

FIG. 8 shows an example of structured display when the medical image interpreter creates an interpretation report, based on such way of thinking. Note that an example of structured display in this embodiment is not limited to this example. For example, in order to check a diagnosis result first, it is preferable for the requesting doctor/clinician, who has requested interpretation, to use a presentation scheme (display form) of showing, as a conclusion made by the medical image interpreter, "diagnosis" and "plan/request" first as candidates of corresponding contents, mainly the diagnosis result. When wanting to know the ground of the diagnosis leading to the conclusion made by the medical image interpreter, it is possible to use a presentation scheme of showing "observation" and "finding". It is also possible to perform structured display by display control so as to set different display sequences as follows. When performing structured display for the requesting doctor, the display sequence is, for example, "diagnosis", "plan/request", "observation", and "finding". When performing structured display for the medical image interpreter, the display sequence is, for example, "observation", "finding", "diagnosis", and "plan/request".

When the processing in step S409 is complete, the procedure for the processing in FIG. 4 which uses the information classification result for display is terminated.

The arrangement according to this embodiment enables the reader of interpretation reports written in a natural language in different manners to easily grasp the contents by presenting information unified in a logical relationship sequence in examination of image diagnosis.

In addition, according to the arrangement of this embodiment, the same effect as that described above can be expected in fields other than interpretation reports and medical care. That is, the written contents or contents for discussion of reports written in a natural language in different manners are presented as information unified in a sequence based on a logical relationship originating from facts. This allows the reader of the reports to easily grasp the contents.

Structure visualization like that shown in FIG. 8 can also be used to compare texts written on a plurality of interpretation reports. FIG. 9A shows a text example. When comparing this text example with the text example in FIG. 5A, results of structuring the respective text examples are compared with each other for each structured item. FIG. 9B shows the comparison result. FIG. 9B is a display showing how the structuring result in FIG. 9A differs from that of the text example shown in FIG. 5A. The display form in FIG. 9B is the same as that in FIG. 8.

Referring to FIG. 5A, "upper lobe of left lung" is the only region written. In contrast to this, FIG. 9A shows both the descriptions "upper lobe of left lung" and "upper lobe of right lung". For this reason, a description about "upper lobe of right lung" is additionally displayed on a "region" row 911. When writing a text, the descriptions "left" and "right" are difficult to visually discriminate; an error tends to occur at such portions. However, using this structure visualization technique will automatically structure such portions as different portions and distinctly display them. This makes it possible to easily find out an error if any.

In addition, as indicated by a "size" field 912 in FIG. 9B, if there is any difference in expression or in terms of the presence or absence of a description between portions at each of which a term, attribute expression, or the like is written, the corresponding portion is displayed to allow comparison between the respective portions. In this example, each arrow indicates a comparison source (the description "about 25 mm" in the text example in FIG. 5A) and a comparison destination (the description "about 27 mm" in the text example in FIG. 9A), thereby displaying the data so as to facilitate discriminating them. With this operation, when, for example, comparing a plurality of interpretation reports about the same patient, a medical image interpreter is enabled to easily check changes in the contents of the interpretation reports by displaying contents of a given interpretation report created at an early time on the left side of each arrow and displaying contents of another interpretation report created at a later time on the right side of the arrow. This makes it possible to easily compare texts written in a plurality of interpretation reports by using structured presentation.

Figure 10:
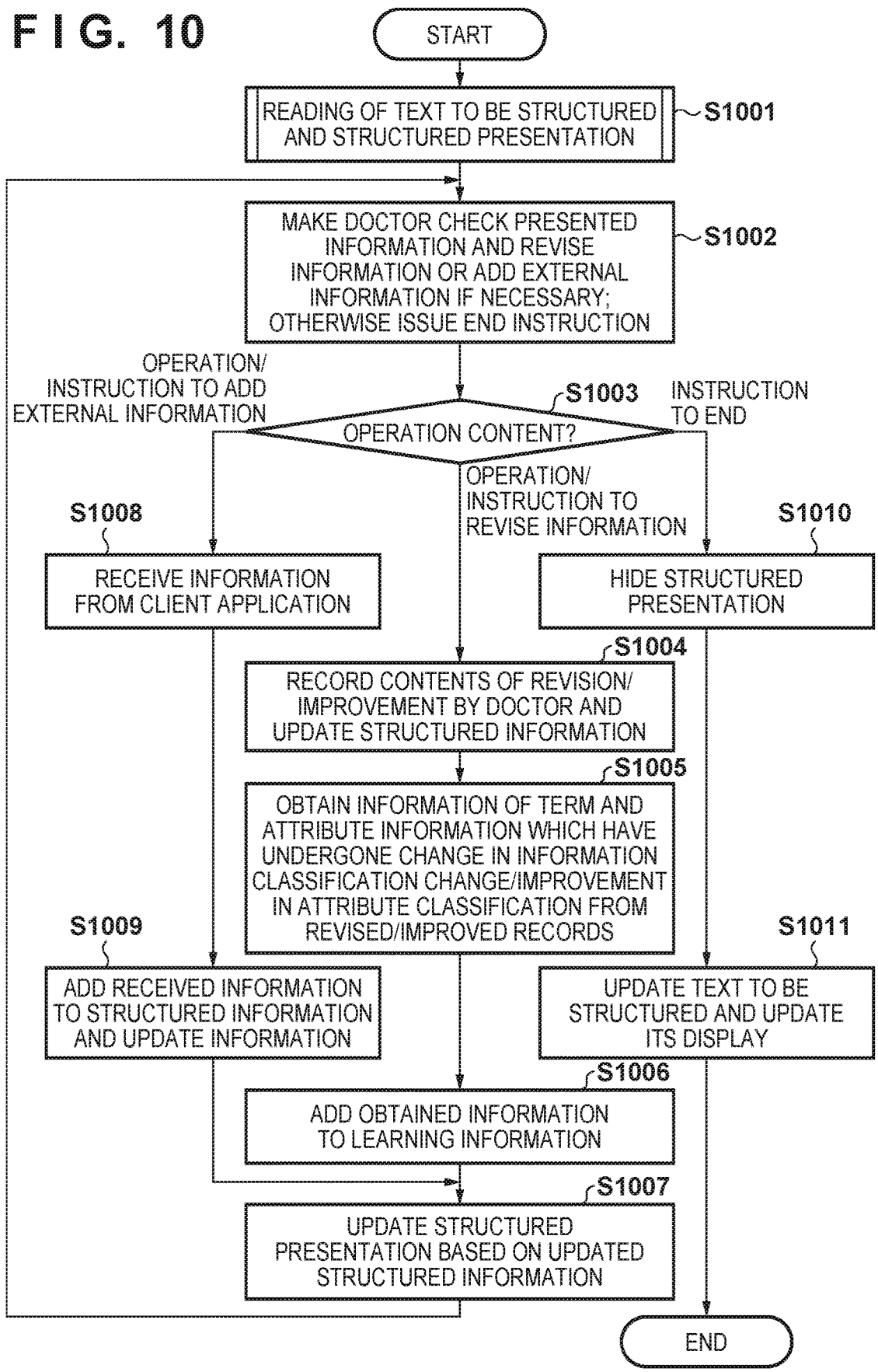
FIG. 10 is a flowchart showing a processing procedure when creating an interpretation report while performing structural presentation.

FIG. 10 is a flowchart showing a procedure for processing to be performed when creating an interpretation report while performing structured presentation. A procedure for processing by the lesion detecting operation unit 343 and the image lesion detection unit 331 (FIG. 3) and a procedure for processing to be performed when using a measurement result obtained by the medical image viewer 342 (FIG. 3) will be described in detail in a case in which while an interpretation report is actually created, the report is checked/revised by structured presentation.

The following is a procedure for processing to be performed when creating an interpretation report, while structuring the interpretation report, by revising the contents of structured presentation or adding/revising the written contents when the contents are wrong. Processing to be performed when the interpretation report shown in FIG. 11A is used as a text example will be described in detail.

In step S1001, a text to be structured is read, and structured presentation is performed. This processing corresponds to processing to be performed when using structured presentation described with reference to FIG. 4. FIG. 11B is a view showing an image example of structured presentation cooperating with interpretation report creation. The display contents are basically the same as those shown in FIG. 8 except that an operation input portion (button 1101) for adding a term or supplementary expression, which is used by the user to perform an editing operation, is additionally displayed. A doctor can input a term or supplementary expression in a blank portion displayed on the right side of the row of the button 1101. When the doctor presses the button 1101 after an input operation, the input term or supplementary expression is additionally displayed in the structured display. Assume that while a "state" field is selected with a mouse or the like, the doctor has input a term or supplementary expression in a blank field 1106 and pressed the button 1101. In this case, the information input in the blank field 1106 is additionally displayed in a display field 1103. In addition, the doctor can also designate a display field with the mouse or the like, revise written contents, and edit the display contents. When the doctor presses an end button 1105, the display control for performing such editing is terminated.

An operation input portion (button 1102) is an operation input portion (button) to be used when performing an editing operation for adding a new region. The doctor can input a region in a blank field portion displayed on the right side of the row of the button 1102. When the doctor presses the button 1102 after the input operation, the input region is additionally displayed in the structured display. A blank field portion for addition by the operation of the button 1101 and a blank field portion for addition by the operation of the button 1102 are displayed under the structured display to allow addition of a new term or supplementary expression and addition of a new region.

In the processing in step S1001, the classifying structuring unit 363 in FIG. 3 generates the content information of structured presentation, and the structure visualizing unit 362 generates display contents. The interpretation report word processor 341 then performs display control for displaying the generation result on the screen. In addition, the interpretation report word processor 341 receives an operation/revision instruction input from the input apparatus 104. The operation/revision contents are returned to the structure visualizing unit 362 and the classifying structuring unit 363, which in return execute subsequent processing corresponding to the operation/revision contents. The interpretation report word processor 341 performs display control of the subsequent processing result. When the processing in step S1001 is complete, the process advances to step S1002.

In step S1002, the doctor checks the presented information. If necessary, the doctor executes processing for revision or adding operation of external information. If revision and addition are not necessary, the doctor executes processing for issuing an end instruction. For example, the doctor checks the contents of information on the screen in FIG. 11B. An operation input received by the interpretation report word processor 341 is then transmitted to the structure visualizing unit 362 and the classifying structuring unit 363. The structure visualizing unit 362 and the classifying structuring unit 363 execute processing corresponding to the operation input. When the processing in step S1002 is complete, the process advances to step S1003.

In step S1003, the process branches depending on the content of operation received in step S1002. If the content of operation is an information revising operation/instruction, the process advances to step S1004. If the content of operation is an external information adding operation/instruction, the process advances to step S1008. If the content of operation is an end instruction, the process advances to step S1010.

In step S1004, the doctor records the contents of revision/improvement, and executes processing for updating the structured information. FIG. 12A is a view showing a screen example for structured display updated by an editing operation (revision/improvement) performed by the doctor in step S1004. The display contents shown in FIG. 12A are a result of an editing operation (revision/improvement) performed by the doctor, which is displayed on the screen under display control by the interpretation report word processor 341. The contents of revision/improvement are transmitted to the structure visualizing unit 362. The structure visualizing unit 362 records the contents of revision/improvement. The structure visualizing unit 362 then sends the contents of revision/improvement to the interpretation report management unit 333, which in return records the contents of revision/improvement on the contents of the interpretation report. The structure visualizing unit 362 updates the structured information by using the contents.

The display contents in FIG. 12A are edited by an operation by a doctor. A display field 1213 corresponds to the display field 1103 in FIG. 11B. Referring to FIG. 12A, the content of the display field 1213 is deleted. In addition, the description "entire lungs" is added in a display field 1216 of "region". In addition, a description concerning an infiltrative shadow is added to a display field 1217 as a finding with respect to the added region ("entire lungs"). The contents of this editing operation (revision/improvement) are recorded, and the structured information is updated in accordance with the contents of revision/improvement. When the processing in step S1004 is complete, the process advances to step S1005.

In step S1005, information of terms and attribute expressions (supplementary expressions and perceptual expressions) is obtained, which has undergone information classification changes and attribute classification changes/improvements, from revision/improvement records. The classifying structuring unit 363 executes this processing.

FIG. 12B is a view exemplarily showing the obtained information of the terms and the attribute expressions which have undergone information classification changes and attribute classification changes/improvements. Although the columns under "information classification" are the same as those in FIG. 6B, the contents of changes in the display fields 1213 and 1217 in FIG. 12A are written in the "editing type" column at the head. Creating and using such information allow the information to be used as learning information concerning terms and attribute expressions (supplementary expressions and perceptual expressions) in the subsequent processing.

When the processing in step S1005 is complete, the process advances to step S1006. In step S1006, the obtained information (terms and attribute expressions (supplementary expressions and perceptual expressions)) is added to the learning information. The classifying structuring unit 363 executes this processing. In practice, the processing is implemented by, for example, updating a dictionary or statistic information. When revising a term, supplementary expression, or the like which has already undergone information classification, information (classification pattern/structure estimation information) stored in the estimated information storage unit 364 is updated. When a new term, supplementary expression, or the like is added, the added term, supplementary expression, or the like is transferred to the term expression obtaining unit 365, which in turn updates information stored in the medical term dictionary 366, the statistic information storage unit 367, which stores medical term co-occurrence pattern statistic information, the perceptual expression dictionary 368, and the like based on the term, supplementary expression, or the like. Outputs from the classifying structuring unit 363 and the estimated information storage unit 364 then change based on an information update result. When the processing in step S1006 is complete, the process advances to step S1007.

In step S1007, structured presentation is updated based on the updated structured information. In this processing, the classifying structuring unit 363 generates information indicating the contents of new structured presentation reflecting the result of learning in step S1006, and transmits the generated information to the interpretation report word processor 341. The interpretation report word processor 341 performs new structured display based on the transmitted information. When the processing in step S1007 is complete, the process advances to step S1002.

Step S1008 is the processing executed when the content of operation is an external information adding operation/instruction in step S1003, in which a server corresponding to a client application receives information from the client application. Upon receiving the information, the server executes predetermined processing and outputs the result. The client application corresponds to, for example, the case search operation unit 345, the electronic health record word processor 344, the interpretation report word processor 341, the lesion detecting operation unit 343, the medical image viewer 342, or the like.

When the client application is the case search operation unit 345, the electronic health record system/server 324 receives written contents selected from an electronic health record or the like as a presented search result or case. For example, the similar case search unit 327 of the electronic health record system/server 324 searches for a case corresponding to the received search information, a similar case having a predetermined similarity to a case corresponding to the search information, or a corresponding written portion of an electronic health record corresponding to the medical care information of the patient.

When the client application is the electronic health record word processor 344, the electronic health record system/server 324 receives a written content of the selected electronic health record. For example, the electronic health record management unit 325 of the electronic health record system/server 324 browses and obtains electronic health record information of the patient which corresponds the obtained written content, and provides the obtained information.

When the client application is the interpretation report word processor 341, the interpretation report system/server 332 receives written contents of a selected interpretation report. When the client application is the lesion detecting operation unit 343, the medical image system/server 328 receives information concerning lesion information selected from lesion information on a presented image. For example, the image lesion detection unit 331 of the medical image system/server 328 provides lesion candidate information in a medical image to a doctor as a user based on information concerning selected lesion information.

When the client application is the medical image viewer 342, the medical image system/server 328 receives, for example, as information, a result of measuring the length, size, or the like on a presented medical image. For example, the medical image management unit 329 of the medical image system/server 328 obtains and provides a medical image related to information such as the obtained measurement result or the like. Information obtained by each client application from the functional configuration of each server is transferred to the interpretation report word processor 341 or the electronic health record word processor 344 via the interapplication cooperating function 346 and can be processed as input information to the interpretation report word processor 341 or the electronic health record word processor 344.

FIG. 13A is a view showing an example of information received from the image lesion detection unit 331. In this case, lesion information selected on the lesion detecting operation unit 343 is received. This information has the same form as that shown in FIG. 6B except that "details" of "information classification" is designed to discriminate each lesion information (for example, "lesion detection-1") detected by the image lesion detection unit 331, and indicates a specific medical image or a specific area on the medical image. A detected lesion/abnormality name is written in "term", and its "supplementary expression" is stored as a value measured on a region or image. The "perceptual expression" column includes information for discriminating an input source. In this column, information indicating that information is created by the image lesion detection unit as an input source is written. This discriminates the description from a description made by a doctor as an input source. When the processing in step S1008 is complete, the process advances to step S1009.

In step S1009, the interpretation report system/server 332 adds the received information to the structured information and updates the information. In this step, the interpretation report system/server 332 performs update processing by adding information in FIG. 13A to the presented contents of structured information obtained by the classifying structuring unit 363. Processing results obtained by the respective functional configurations (the interpretation report management unit 333, the interpretation report work management unit 335, and the interpretation report structuring unit 336 (the structured format conversion unit 361, the structure visualizing unit 362, the classifying structuring unit 363, the term expression obtaining unit 365, and the natural language processing unit 369)) of the interpretation report system/server 332 are provided. The classifying structuring unit 363 then transmits the presented contents of the updated structured information as display information to the interpretation report word processor 341.

In step S1007, the interpretation report word processor 341 performs display control to display the presented contents of the updated structured information on the screen. The structured information is updated and displayed by display control by the interpretation report word processor 341.

FIG. 13B is a view exemplarily showing the display contents of the updated structured information presented on the screen. The arrangement of the display contents are the same as those in FIG. 11B except that "upper lobe of right lung" of a region added in the information in FIG. 13A is added to a display field 1301, and information about a nodule is added to display fields 1302 and 1303. Information indicating the size of the region is added to the display field 1302 and is displayed in combination with information indicating that the region is automatically measured by the image lesion detection unit 331. In the display field 1303, the description "<image lesion detection>" indicating that the information is created by the image lesion detection unit 331 as an input source is written. The "perceptual expression" column includes information for discriminating input sources; a term (supplementary expression) and a perceptual expression (input source) corresponding to the term (supplementary expression) are presented in combination. This discriminates the description from a description made by the doctor as an input source.

When the processing in step S1007 is complete, the process advances to step S1002 to perform processing similar to that described above.

Step S1010 is a step of executing processing to be executed when the process branches upon determining in step S1003 that the content of operation is an end instruction, and the structured presentation is hidden. When the processing in step S1010 is complete, the process advances to step S1011 to update the information of the text to be structured. This terminates the editing operation (revision/improvement) by the doctor and the reception and recording of information from the client application. If there is a display portion of the text to be structured, the display is updated, and the processing is terminated.

With the processing shown in FIG. 10, an interpretation report is created while this structured presentation is performed in this manner. In this case, editing/improvement by a doctor and the reception of information from a client application can be performed, together with structured presentation. It is possible to record this information in a structured state. Although the above description has exemplified the creation of an interpretation report, it may be applied to a case in which image diagnosis information is written in other types of medical texts such as an electronic health record.

According to this embodiment, the contents of interpretation reports written in a natural language in different manners are presented as information unified in a logical relationship sequence in consideration of image diagnosis. This allows the reader of the interpretation reports to easily grasp the contents. Reexamining an interpretation report created by using information presented based on a logical relationship allows the writer of the interpretation report to easily find out descriptive insufficiency or an error. In addition, using a unified sequence allows the reader of interpretation reports to easily compare the written contents of the interpretation reports with each other. This makes it possible to easily find out differences between a plurality of interpretation reports.

According to this embodiment, reducing work load when creating or reading a text can improve work efficiency and allows the creator of a text to focus his/her attention on analysis and judgement which are his/her primary operations. In addition, the arrangement of the embodiment can also be applied in the same manner to fields other than medical care such as interpretation report writing and electronic health record writing.

According to this embodiment, it is possible to present the contents of a text in a unified form and facilitate grasping the contents of the text.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-027942, filed Feb. 16, 2015, which is hereby incorporated by reference herein in its entirety.

What is claimed is:

1. An information processing apparatus comprising:
an analysis unit configured to analyze a modification relation between words in a medical text;
an obtaining unit configured to obtain a term appearing in the medical text and a supplementary expression corresponding to the term from the medical text based on a result of the analysis and dictionary data including medical terms;
a classifying structuring unit configured to classify the term and the supplementary expression corresponding to the term based on a usage type of the term; and
a display control unit configured to display the term and the supplementary expression corresponding to the term classified by the classifying structuring unit based on a presentation sequence,
wherein the supplementary expression is grouped for attribute classifications,
wherein the display control unit decides the presentation sequence of the attribute classifications and the supplementary expression to display the supplementary expression corresponding to the attribute classifications in the same row or column, and
wherein the analysis unit, the obtaining unit, the classifying structuring unit, and the display control unit are implemented using a processor and a program stored in a memory.

2. The apparatus according to claim 1, wherein the obtaining unit is configured to obtain the term appearing in the medical text, the supplementary expression corresponding to the term, and a perceptual expression corresponding to the term and the supplementary expression based on the result of the analysis, and
the classifying structuring unit is configured to classify the term, the supplementary expression, and the perceptual expression based on the usage type of the term.

3. The apparatus according to claim 1, wherein the classifying structuring unit is configured to perform the classification by using, as the usage type of the term, a usage rule of the term, statistic information based on medical texts created in the past, and information indicating a co-occurrence relationship between the term and other terms.

4. The apparatus according to claim 1, wherein the analysis unit is configured to perform morphological analysis to obtain terms appearing in the medical text on a word basis and syntax analysis to analyze a modification relation between the words.

5. The apparatus according to claim 4, wherein the obtaining unit is configured to obtain the term appearing in the medical text, the supplementary expression corresponding to the term, and a perceptual expression corresponding to the term and the supplementary expression based on a result of the morphological analysis, a result of the syntax analysis, and dictionary data.

6. The apparatus according to claim 5, wherein the display control unit is configured to present the term and a perceptual expression corresponding to the term in combination with each other in accordance with the presentation sequence.

7. The apparatus according to claim 5, wherein the display control unit is configured to present the supplementary expression and a perceptual expression corresponding to the supplementary expression in combination with each other in accordance with the presentation sequence.

8. The apparatus according to claim 1, further comprising a conversion unit configured to convert the result of the classification into a predetermined format and output the result of the classification in the converted format,
wherein the conversion unit is implemented using the processor and the program stored in the memory.

9. The apparatus according to claim 1, further comprising a structure visualization unit configured to decide a presentation sequence of presenting the result of the classification,
wherein the display control unit is configured to perform display control for causing a display unit to display the result of the classification in accordance with the presentation sequence, and
wherein the structure visualization unit is implemented using the processor and the program stored in the memory.

10. The apparatus according to claim 9, wherein the display control unit is configured to perform display control to cause the display unit to display a difference obtained by comparing results of the classification generated from different medical texts.

11. The apparatus according to claim 9, wherein the classifying structuring unit is configured to update the result of the classification based on an editing operation with respect to display by the display unit, and
the display control unit is configured to present the updated result of the classification based on the presentation sequence.

12. An information processing method comprising:
analyzing a modification relation between words in a medical text;
obtaining a term appearing in the medical text and a supplementary expression corresponding to the term from the medical text based on a result of the analysis and dictionary data including medical terms;
classifying the term and the supplementary expression corresponding to the term based on a usage type of the term; and
displaying the term and the supplementary expression corresponding to the term classified in the classifying step based on a presentation sequence, wherein the supplementary expression is grouped for attribute classifications, wherein the displaying step decides the presentation sequence of the attribute classifications and the supplementary expression to display the supplementary expression corresponding to the attribute classifications in the same row or column.

13. An information processing system comprising:

an analysis unit configured to analyze a modification relation between words in a medical text;

an obtaining unit configured to obtain a term appearing in the medical text and a supplementary expression corresponding to the term from the medical text based on a result of the analysis and dictionary data including medical terms;

a classifying structuring unit configured to classify the term and the supplementary expression corresponding to the term based on a usage type of the term, and a display control unit configured to display the term and the supplementary expression corresponding to the term classified by the classifying structuring unit based on a presentation sequence, wherein the supplementary expression is grouped for attribute classifications, wherein the display control unit decides the presentation sequence of the attribute classifications and the supplementary expression to display the supplementary expression corresponding to the attribute classifications in the same row or column, and wherein the analysis unit, the obtaining unit, the classifying structuring unit, and the display control unit are implemented using a processor and a program stored in a memory.

14. A computer-readable storage medium storing a program for causing a computer to function as each unit of an information processing apparatus, the information processing apparatus comprising:

an analysis unit configured to analyze a modification relation between words in a medical text;

an obtaining unit configured to obtain a term appearing in the medical text and a supplementary expression corresponding to the term from the medical text based on a result of the analysis and dictionary data including medical terms;

a classifying structuring unit configured to classify the term and the supplementary expression corresponding to the term based on a usage type of the term, and a display control unit configured to display the term and the supplementary expression corresponding to the term classified by the classifying structuring unit based on a presentation sequence, wherein the supplementary expression is grouped for attribute classifications, wherein the display control unit decides the presentation sequence of the attribute classifications and the supplementary expression to display the supplementary expression corresponding to the attribute classifications in the same row or column.

15. An information processing apparatus comprising:

an analysis unit configured to analyze a modification relation between words in a medical text;

an obtaining unit configured to obtain a term appearing in the medical text and a supplementary expression corresponding to the term from the medical text based on a result of the analysis and dictionary data including medical terms;

a classifying structuring unit configured to classify the term and the supplementary expression corresponding to the term based on a usage type of the term, and a display control unit configured to display the term and the supplementary expression corresponding to the term classified by the classifying structuring unit based on a presentation sequence, wherein the supplementary expression is grouped for attribute classifications, wherein the display control unit decides the presentation sequence of the attribute classifications and the supplementary expression to display the supplementary expression corresponding to the attribute classifications in the same row or column, and wherein the analysis unit, the obtaining unit, the classifying structuring unit, and the display control unit are implemented using a processor and a program stored in a memory.

16. An information processing system comprising:

an analysis unit configured to analyze a modification relation between words in a medical text;

an obtaining unit configured to obtain a term appearing in the medical text and a supplementary expression correspond to the term from the medical text based on a result of the analysis and dictionary data including medical terms;

a classifying structuring unit configured to classify the term and the supplementary expression corresponding to the term based on a usage type of the term; and a display control unit configured to display the term and the supplementary expression corresponding to the term classified by the classifying structuring unit based on a presentation sequence, wherein the supplementary expression is grouped for attribute classifications, wherein the display control unit decides the presentation sequence of the attribute classifications and the supplementary expression to display the supplementary expression corresponding to the attribute classifications in the same row or column, and wherein the analysis unit, the obtaining unit, the classifying structuring unit, and the display control unit are implemented using a processor and a program stored in a memory.

\* \* \* \* \*